United States Patent
Taguchi

(10) Patent No.: US 10,773,399 B2
(45) Date of Patent: Sep. 15, 2020

(54) CONTROL DEVICE AND ROBOT SYSTEM

(71) Applicant: Seiko Epson Corporation, Tokyo (JP)

(72) Inventor: Makoto Taguchi, Matsumoto (JP)

(73) Assignee: Seiko Epson Corporation (JP)

( * ) Notice: Subject to any disclaimer, the term of this patent is extended or adjusted under 35 U.S.C. 154(b) by 303 days.

(21) Appl. No.: 15/981,026

(22) Filed: May 16, 2018

(65) Prior Publication Data

US 2018/0339414 A1 Nov. 29, 2018

(30) Foreign Application Priority Data

May 25, 2017 (JP) ................................. 2017-103795

(51) Int. Cl.
| | |
|---|---|
| *B25J 9/00* | (2006.01) |
| *B25J 19/02* | (2006.01) |
| *B25J 13/08* | (2006.01) |
| *B25J 9/16* | (2006.01) |
| *B25J 13/06* | (2006.01) |

(52) U.S. Cl.
CPC ............ *B25J 19/028* (2013.01); *B25J 9/0081* (2013.01); *B25J 9/1633* (2013.01); *B25J 9/1684* (2013.01); *B25J 9/1687* (2013.01); *B25J 13/06* (2013.01); *B25J 13/085* (2013.01)

(58) Field of Classification Search
CPC ...... B25J 19/028; B25J 9/1687; B25J 9/1633; B25J 13/085; B25J 9/0081; B25J 9/1684; B25J 13/06
See application file for complete search history.

(56) References Cited

U.S. PATENT DOCUMENTS 9,138,893 B2 9/2015 Nagai et al.
9,333,654 B2 * 5/2016 Chen ...................... B25J 9/1697

FOREIGN PATENT DOCUMENTS

JP 2014-233814 A 12/2014

* cited by examiner

*Primary Examiner* — Ian Jen
(74) *Attorney, Agent, or Firm* — Harness, Dickey & Pierce, P.L.C.

(57) ABSTRACT

A control device controls the arm such that a first contacting operation of setting an object to a first orientation and bringing the object into contact with an inserted object is performed, and an inserting operation of setting the object to a second orientation different from the first orientation and inserting the object by moving the object in a first direction is performed. Between the first contacting operation and the inserting operation, the control device performs a second contacting operation of bringing the object and the inserted object into contact in a portion different from a contact portion in the first contacting operation by performing force control such that a component of a target force in a second direction orthogonal to the first direction is set to a value greater than 0 based on an output from the force sensor at an orientation at which the object is tilted.

20 Claims, 9 Drawing Sheets

| DEVIATION AMOUNT (Q/P) [mm] | COMPARATIVE CONFIGURATION CYCLE TIME [SECONDS] | SUGGESTION CONFIGURATION CYCLE TIME [SECONDS] |
|---|---|---|
| 0/0 | 5.429 | 4.053 |
| 0.5/0.5 | 17.861 | 3.941 |
| 1.0/1.0 | 31.293 | 4.489 |
| 1.5/1.5 | 50.119 | 4.924 |
| 2.0/2.0 | NG | 5.174 |
| −2.0/−2.0 | NG | 4.961 |

CONTROL DEVICE AND ROBOT SYSTEM

BACKGROUND

1. Technical Field

The present invention relates to a control device, and a robot system.

2. Related Art

JP-A-2014-233814 discloses a robot instruction assist device, a robot system, and a robot instruction method (see JP-A-2014-233814). JP-A-2014-233814 exemplifies a case in which work content of a predetermined job for giving an instruction to a robot is a fitting job of fitting works (see paragraph 0013 of JP-A-2014-233814). In JP-A-2014-233814, the fitting job includes a "contacting operation", a "probing operation", and an "inserting operation" (see paragraph 0017 of JP-A-2014-233814). In JP-A-2014-233814, the "contacting operation" is an operation of bringing a work (hereinafter referred to as a "work #1" to facilitate description) grasping with a hand in contact with another work (hereinafter referred to as a "work #2" to facilitate description) at a position at which work #1 is not inserted into a hole of work #2 (see paragraph 0057 of JP-A-2014-233814). The "probing operation" is an operation of swing work #1 around the hole of work #2 while pressing work #1 against work #2 (see paragraph 0058 of JP-A-2014-233814). The "inserting operation" is an operation of inserting work #1 into the hole of work #2.

In this way, in the robot system disclosed in JP-A-2014-233814, the "probing operation" is performed to insert work #1 into work #2.

In the technology disclosed in JP-A-2014-233814, much time is necessary from start to end of the "probing operation" in some cases. As a result, much time is necessary from start to end of the fitting job in some cases. In the technology disclosed in JP-A-2014-233814, the work (herein, work #1 or work 2) is damaged in the "probing operation" in some cases. Further, in the technology disclosed in JP-A-2014-233814, a position of an inserted object (herein, for example, work #2) at which an insertion object (herein, for example, work #1) is inserted is deviated in the "probing operation" in some cases. In the cases, the "inserting operation" may fail in some cases.

As described above, in the related art, a job of inserting the insertion object into the inserted object may not be efficiently performed in a robot that performs the "probing operation" in some cases.

SUMMARY

An aspect of the invention is directed to a control device controlling a robot including a movable unit in which a force measurement unit and a holding unit are installed. The control device includes a control unit that is capable of controlling the movable unit such that a first contacting operation of setting an insertion object held by the holding unit to a first orientation and bringing the insertion object into contact with an inserted object having an insertion port is performed, and subsequently an inserting operation of setting the insertion object to a second orientation different from the first orientation into the insertion port and inserting the insertion object into the insertion port by relatively moving the insertion object and the inserted object in a first direction is performed. Between the first contacting operation and the inserting operation, the control unit performs a second contacting operation of bringing the insertion object and the inserted object into contact with each other in a portion different from a contact portion in the first contacting operation by performing force control such that a component of a target force in a second direction orthogonal to the first direction is set to a value greater than 0 based on an output from the force measurement unit at an orientation at which the insertion object is tilted with respect to the second orientation.

With this configuration, in the control device, by controlling the movable unit, the insertion object and the inserted object are brought into contact with each other in the portion different from the contact portion in the first contacting operation by performing the force control in the second contacting operation such that the component of the target force in the second direction orthogonal to the first direction is set to the value greater than 0 when the first contacting operation, the second contacting operation, and the inserting operation are performed on the insertion object held by the holding unit. Thus, in the control device, by controlling the movable unit, it is possible to efficiently perform a job of inserting the insertion object into the inserted object without performing a probing operation.

The aspect of the invention may be configured such that, in the control device, when the insertion object is set from the first orientation to the second orientation, the control unit performs the force control such that the component of the target force in the second direction is set to the value greater than 0 based on the output from the force measurement unit.

With this configuration, in the control device, the control unit performs the force control such that the component of the target force in the second direction is set to the value greater than 0 based on the output from the force measurement unit when the insertion object is changed from the first orientation to the second orientation. Thus, in the control device, by performing the force control, it is possible to efficiently perform the operation of changing the orientation of the insertion object.

Another aspect of the invention is directed to a control device controlling a robot including a movable unit in which a force measurement unit and a holding unit are installed. The control device includes a control unit that is capable of controlling the movable unit such that a first contacting operation of setting an inserted object having an insertion port and held by the holding unit to a first orientation and bringing the inserted object into contact with an insertion object is performed, and subsequently an inserting operation of setting the inserted object to a second orientation different from the first orientation and inserting the insertion object into the insertion port by relatively moving the inserted object and the insertion object in a first direction is performed. Between the first contacting operation and the inserting operation, the control unit performs a second contacting operation of bringing the insertion object and the inserted object into contact with each other in a portion different from a contact portion in the first contacting operation by performing force control such that a component of a target force in a second direction orthogonal to the first direction is set to a value greater than 0 based on an output from the force measurement unit at an orientation at which the inserted object is tilted with respect to the second orientation.

With this configuration, in the control device, by controlling the movable unit, the insertion object and the inserted object are brought into contact with each other in the portion different from the contact portion in the first contacting operation by performing the force control in the second contacting operation such that the component of the target force in the second direction orthogonal to the first direction is set to the value greater than 0 when the first contacting operation and the second contacting operation are performed on the inserted object held by the holding unit. Thus, in the control device, by controlling the movable unit, it is possible to efficiently perform a job of inserting the insertion object into the inserted object without performing a probing operation.

The aspect of the invention may be configured such that, in the control device, when the inserted object is set from the first orientation to the second orientation, the control unit performs the force control such that the component of the target force in the second direction is set to the value greater than 0 based on the output from the force measurement unit.

With this configuration, in the control device, the control unit performs the force control such that the component of the target force in the second direction is set to the value greater than 0 based on the output from the force measurement unit when the inserted object is changed from the first orientation to the second orientation. Thus, in the control device, by performing the force control, it is possible to efficiently perform the operation of changing the orientation of the insertion object.

The aspect of the invention may be configured such that, in the control device, in the second contacting operation, the control unit performs the force control such that a component of the target force in a third direction orthogonal to the first and second directions is set to a value greater than 0 based on an output from the force measurement unit.

With this configuration, in the control device, the control unit performs the force control such that the component of the target force in the third direction orthogonal to the first and second directions is set to the value greater than 0 based on the output from the force measurement unit in the second contacting operation. Thus, in the control device, by performing the force control, it is possible to efficiently perform the second contacting operation.

The aspect of the invention may be configured such that, in the control device, in the inserting operation, the control unit performs the force control such that a component of the target force in the first direction is set to a value greater than 0 based on an output from the force measurement unit.

With this configuration, in the control device, the control unit performs the force control such that the component of the target force in the first direction is set to the value greater than 0 based on the output from the force measurement unit in the inserting operation. Thus, in the control device, by performing the force control, it is possible to efficiently perform the inserting operation.

The aspect of the invention may be configured such that, in the control device, in the inserting operation, the control unit performs the force control such that the component of the target force in the second direction is less than the component of the target force in the first direction based on an output from the force measurement unit.

With this configuration, in the control device, the control unit performs the force control such that the component of the target force in the second direction is set to the value less than the component of the target force in the first direction based on the output from the force measurement unit in the inserting operation. Thus, in the control device, by performing the force control, it is possible to efficiently perform the inserting operation.

The aspect of the invention may be configured such that, in the control device, the holding unit is rotatable around a first rotation axis, and in the first contacting operation, the second contacting operation, and the inserting operation, the control unit performs the force control such that a component of the target force around the first rotation axis is set to a value less than a component of the target force in the first direction based on an output from the force measurement unit.

With this configuration, in the control device, the control unit performs the force control such that the component of the target force around the first rotation axis is set to the value less than the component of the target force in the first direction based on the output from the force measurement unit in the first contacting operation, the second contacting operation, and the inserting operation. Thus, in the control device, by performing the force control, it is possible to efficiently perform the first contacting operation, the second contacting operation, and the inserting operation.

The aspect of the invention may be configured such that, in the control device, in the first contacting operation, the second contacting operation, and the inserting operation, the control unit performs the force control such that the component of the target force around the first rotation axis is set to 0 based on an output from the force measurement unit.

With this configuration, in the control device, the control unit performs the force control such that the component of the target force around the first rotation axis is set to 0 based on the output from the force measurement unit in the first contacting operation, the second contacting operation, and the inserting operation. Thus, in the control device, by performing the force control, it is possible to efficiently perform the first contacting operation, the second contacting operation, and the inserting operation.

The aspect of the invention may be configured such that, in the control device, an angle of the tilting is less than 45 degrees.

With this configuration, in the control device, the angle of the tilting is less than 45 degrees. Thus, in the control device, it is possible to improve the reliability that the insertion object is inserted into the inserted object.

The aspect of the invention may be configured such that, in the control device, the control unit elastically deforms at least one of the insertion object and the inserted object in the inserting operation.

With this configuration, in the control device, the control unit elastically deforms at least one of the insertion object and the inserted object in the inserting operation. Thus, in the control device, when the insertion object may not be inserted into the inserted object in a state in which the insertion object may not be elastically deformed, the insertion object can be inserted into the inserted object by elastically deforming at least one of the insertion object and the inserted object.

The aspect of the invention may be configured such that, in the control device, the force measurement unit measures a force with a piezoelectric element.

With this configuration, in the control device, the force measurement unit measures the force with the piezoelectric element. Thus, in the control device, it is possible to reduce an error and improve precision with regard to the force control.

The aspect of the invention may be configured such that, in the control device, the piezoelectric element is a quartz crystal.

With this configuration, in the control device, the piezoelectric element in the force measurement unit is the quartz crystal. Thus, in the control device, it is possible to reduce an error and improve precision with regard to the force control.

Still another aspect of the invention is directed to a robot controlled by the control device.

With this configuration, the robot is controlled by the foregoing control device. Thus, in the robot, by controlling the movable unit, it is possible to efficiently perform the job of inserting the insertion object into the inserted object without performing a probing operation.

Still another aspect of the invention is directed to a robot system including the control device and a robot controlled by the control device.

With this configuration, in the robot system, the robot is controlled by the foregoing control device. Thus, in the robot system, by controlling the movable unit, it is possible to efficiently perform the job of inserting the insertion object into the inserted object without performing a probing operation.

As described above, in the control device, the robot, and the robot system according to the aspects of the invention, by controlling the movable unit, the insertion object and the inserted object are brought into contact with each other in the portion different from the contact portion in the first contacting operation by performing the force control in the second contacting operation such that the component of the target force in the second direction orthogonal to the first direction is set to the value greater than 0 when the first contacting operation, the second contacting operation, and the inserting operation are performed on the insertion object held by the holding unit. Thus, in the control device, the robot, and the robot system according to the aspect of the invention, by controlling the movable unit, it is possible to efficiently perform a job of inserting the insertion object into the inserted object without performing a probing operation.

As described above, in the control device, the robot, and the robot system according to the aspects of the invention, by controlling the movable unit, the insertion object and the inserted object are brought into contact with each other in the portion different from the contact portion in the first contacting operation by performing the force control in the second contacting operation such that the component of the target force in the second direction orthogonal to the first direction is set to the value greater than 0 when the first contacting operation and the second contacting operation are performed on the inserted object held by the holding unit. Thus, in the control device, the robot, and the robot system according to the aspect of the invention, by controlling the movable unit, it is possible to efficiently perform a job of inserting the insertion object into the inserted object without performing a probing operation.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described in detail with reference to the drawings.

In the following description, the term, "installed" or "has been installed", include both a configuration of not being detachably mounted and a configuration of being detachably mounted.

First Embodiment

Robot System

Figure 1:
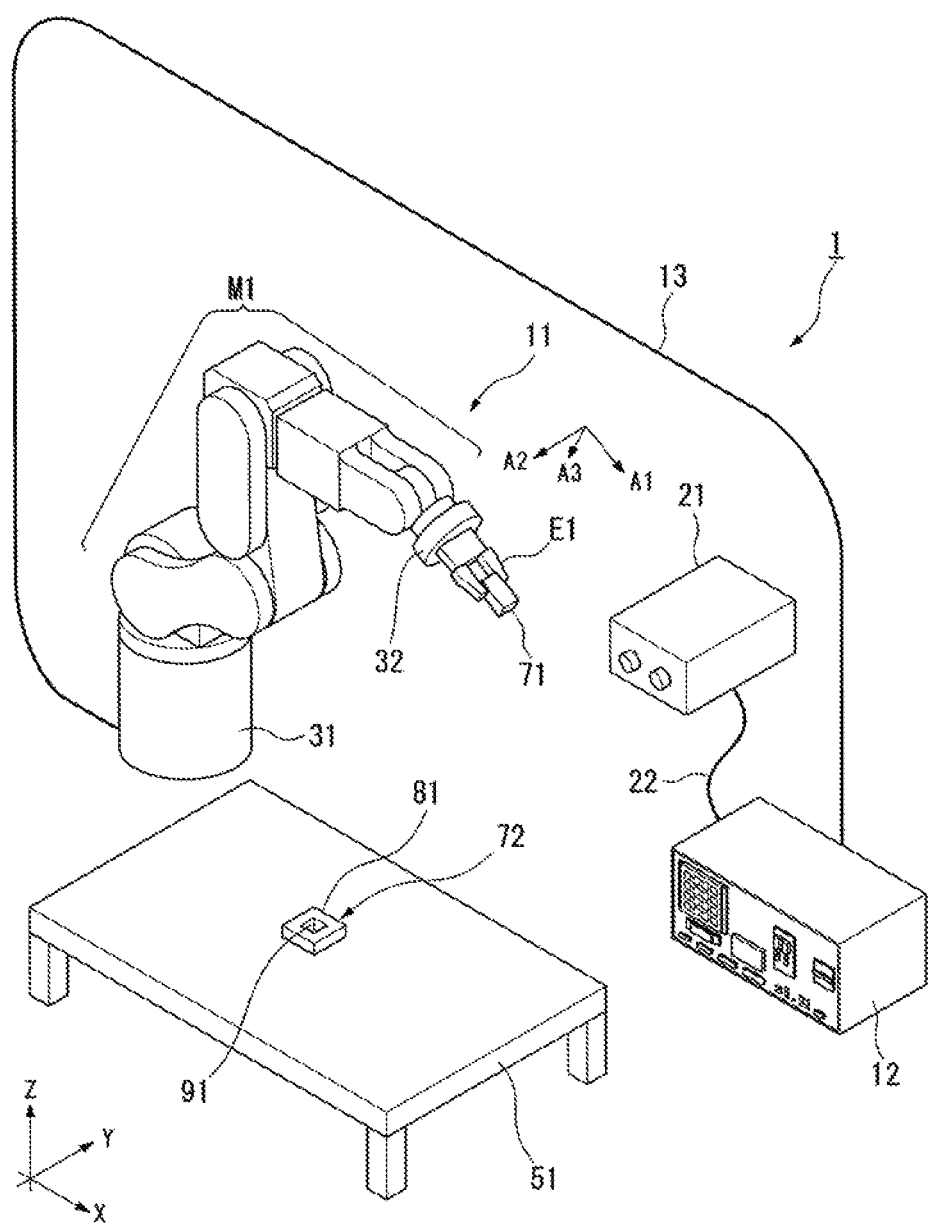
FIG. 1 is a diagram illustrating a schematic configuration example of a robot system according to an embodiment (first embodiment) of the invention.

FIG. 1 is a diagram illustrating a schematic configuration example of a robot system 1 according to an embodiment (first embodiment) of the invention.

In FIG. 1, to facilitate the description, an X-Y-Z coordinate system which is a 3-dimensional orthogonal coordinate system and an A1-A2-A3 coordinate system which is a 3-dimensional orthogonal coordinate system are illustrated. In the X-Y-Z coordinate system, X, Y, and Z axes are orthogonal to each other. In the A1-A2-A3 coordinate system, A1, A2, and A3 axes are orthogonal to each other.

The robot system 1 includes a robot 11, a control device 12 (robot control device), a cable 13 that connects the robot 11 to the control device 12 in a communicable manner, an imaging device 21, and a cable 22 that connects the imaging device 21 to the control device 12 in a communicable manner.

FIG. 1 illustrates a table 51, an insertion object 71 which is a work held by the robot 11, and an inserted object 72 that is a work placed on the table 51.

In the embodiment, when the insertion object 71 is inserted into the inserted object 72, a part of the insertion object 71 or the whole insertion object 71 is covered with the inserted object 72.

Here, in the embodiment, a configuration in which a work is held includes configurations in which a work is held in various aspects, for example, a configuration in which the work is held in an aspect in which the work is held by a plurality of fingers or the like and a configuration in which the work is held in an aspect in which the work is adsorbed by a adsorption mechanism.

In the embodiment, holding can include grasping.

In the embodiment, an insertion object 71 has a cubic (for example, square columnar) shape.

The inserted object 72 includes a planar support 81 and one hole 91 formed on one surface of the support 81. The surface of the hole 91 forms an opening (insertion port). The hole 91 has a shape and a size in which the insertion object 71 can be inserted into the hole 91. In the embodiment, even when the insertion object 71 is larger than the hole 91 and the insertion object 71 can be inserted into the hole 91 to be assembled, the insertion object 71 can be held by the robot 11. As another example, when the hole 91 has the same size as the insertion object 71 or when the insertion object 71 is less than the hole 91, the insertion object 71 can be held by the robot 11 using an absorption mechanism or the like.

The insertion object 71 and the hole 91 of the inserted object 72 have any shape or any size. For example, a cylindrical shape may be used instead of a cubic shape.

At one or more of the table 51, the insertion object 71, and the inserted object 72 may also be understood to be included in the robot system 1.

In the example of FIG. 1, the details of a wiring connecting the robot 11 to the control device 12 are omitted and only one cable 13 is illustrated, but any wiring may be used. Similarly, in the example of FIG. 1, the details of a wiring connecting the imaging device 21 to the control device 12 are omitted and only one cable 22 is illustrated, but any wiring may be used.

The robot 11 includes a base 31 (support base), a manipulator (which may also be referred to as an "arm") M1 which is an example of a movable unit, a force measurement unit 32 (a force sensor), and an end effector E1 which is an example of a holding unit. For example, the end effector E1 can also be understood to be the movable unit. The end effector E1 is installed at the distal end of the manipulator M1.

Here, in the embodiment, the robot 11 is a single arm robot.

In the example of FIG. 1, the end effector E1 in the robot 11 holds the insertion object 71 which is a target object.

In the embodiment, the control device 12 is installed to be separate from the robot 11. As another configuration example, the control device 12 may be integrated with the robot 11. For example, the control device 12 may be installed inside the base 31 of the robot 11.

In the embodiment, a configuration in which communication is performed via the wired cables 13 and 22 is realized. As another configuration example, a configuration in which communication is performed via a wireless line instead of the wired cable with regard to one or more of the cables may be used.

Here, in the embodiment, for example, a base coordinate system in which the base 31 of the robot 11 serves as a reference is used as the X-Y-Z coordinate system. In the embodiment, when viewed from the base 31 of the robot 11, the X-Y-Z coordinate system is fixed. Therefore, in the embodiment, when it is assumed that the base 31 of the robot 11, the table 51, and the inserted object 72 are not moved, the X-Y-Z coordinate system is unchanged with respect to them.

In the embodiment, for example, for example, a work coordinate system in which the insertion object 71 serves as a reference is used as the A1-A2-A3 coordinate system. In the embodiment, the A1-A2-A3 coordinate system is fixed when viewed from the insertion object 71. Therefore, in the embodiment, when the position or an orientation is changed, the A1-A2-A3 coordinate system is also changed in response to the change in the position or the orientation of the insertion object 71.

In the embodiment, the origin of the A1-A2-A3 coordinate system is located at the center of gravity of the insertion object 71. The origin may be located at another position.

In the embodiment, to facilitate the description, a direction oriented from the negative direction to the positive direction of the axis A1 is referred to as a direction A1, a direction oriented from the negative direction to the positive direction of the axis A2 is referred to as a direction A2, and a direction oriented from the negative direction to the positive direction of the axis A3 is referred to as a direction A3.

In the embodiment, to facilitate the description, a state of a moment (torque) of rotation around the direction A1 is referred to as a torque A1, a state of a moment (torque) of rotation around the direction A2 is referred to as a torque A2, and a state of a moment (torque) of rotation around the direction A3 is referred to as a torque A3.

Imaging Device

The imaging device 21 is configured with, for example, a camera.

The imaging device 21 captures an image and transmits information regarding the captured image to the control device 12 via the cable 22.

In the embodiment, the imaging device 21 is installed at a location at which a situation of an operation (a situation of a job) performed by the robot 11 can be imaged.

Force Measurement Unit

The force measurement unit 32 is installed in the robot 11 and measures one or both of a force or a moment received by the robot 11.

As another configuration example, a torque sensor may be used instead of the force measurement unit 32. In this case, the torque sensor may be installed at any spot of the manipulator M1 of the robot 11.

Here, a piezoelectric type force measurement unit using a piezoelectric element that measures a force or a moment through measurement of electric contact may be used as a preferred example of the force measurement unit 32. The piezoelectric type force measurement unit has high rigidity compared to, for example, an electrostatic type or a strain gauge type, and thus it is possible to reduce an error and improve precision. The high rigidity is a nature in which an error amount (for example, when a structure in which an elastic body is deformed in accordance with an applied load, an error amount according to an amount of the deformation)

is small with respect to an applied load (a force or a moment) applied to the force measurement unit.

As a preferred example of the force measurement unit 32, a force measurement unit using a quartz crystal as a piezoelectric element may further be used. By using a quartz crystal as a piezoelectric element, for example, it is possible to reduce an error and improve precision.

An element other than a quartz crystal may be used as a piezoelectric element.

A type of force measurement unit other than the piezoelectric type may be used as the force measurement unit 32.

Single Arm Robot

In the embodiment, the base 31 of the robot 11 is installed to be fixed on a floor.

One end of the manipulator M1 of the robot 11 is connected to the base 31. The other end of the manipulator M1 of the robot 11 is connected to the end effector E1 with the force measurement unit 32 interposed therebetween.

The manipulator M1 of the robot 11 has a 6-axis vertical articulated structure and 6 articulations. Each articulation includes an actuator (not illustrated). In the robot 11, operations of 6-axis degrees of freedom are performed through operations of the actuators of the 6 articulations. In the embodiment, as one of the operations, the manipulator M1 can be rotated around a rotation axis of the distal end (the end on the side on which the end effector E1 is mounted).

As another configuration example, a robot that performs an operation to 5 or less-axis degrees of freedom or a robot that performs an operation to 7 or more-axis degrees of freedom may be used.

The end effector E1 of the robot 11 is, for example, a hand, includes fingers capable of holding an object by clipping the object, and is an example of a holding unit. As another configuration example, any effector may be used as the end effector E1 of the robot 11. For example, an object may be adsorbed using air suction or an object is approached using a magnetic force. In the embodiment, the absorbing and approaching are examples of the holding. That is, an example of the holding unit may include fixing an object to the holding unit in accordance with any method.

Control Device

The control device 12 controls the robot 11. For example, the control device 12 controls each actuator included in the manipulator M1, the force measurement unit 32, and the end effector E1.

The control device 12 can control the imaging device 21.

The control device 12 receives information regarding a measurement result from the force measurement unit 32.

The control device 12 receives information regarding an image from the imaging device 21.

The control device 12 may control the robot 11 based on one or more of information received from the force measurement unit 32 and the imaging device 21.

Figure 2:
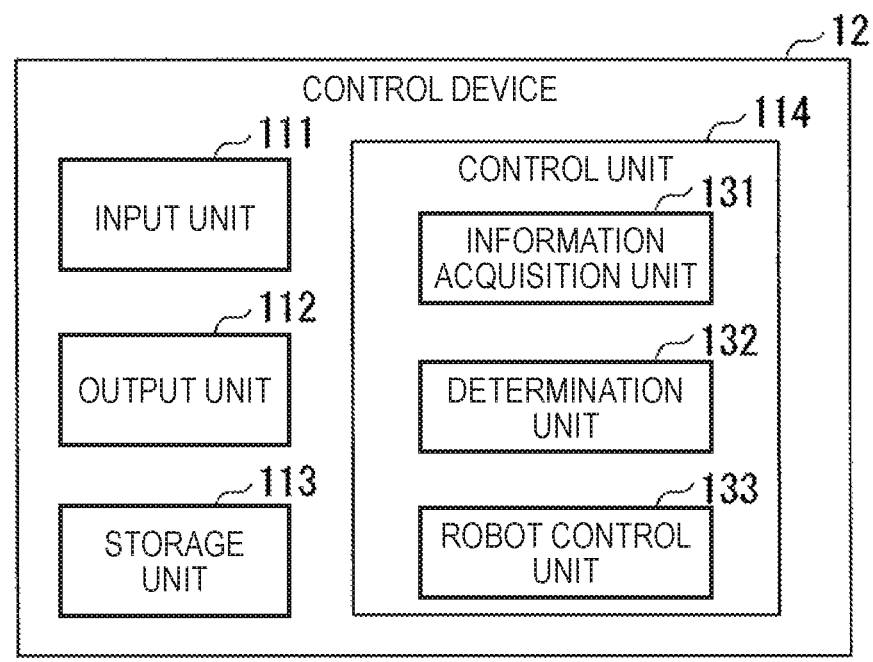
FIG. 2 is a diagram illustrating a schematic configuration example of a control device according to the embodiment (first embodiment) of the invention.

FIG. 2 is a diagram illustrating a schematic configuration example of the control device 12 according to the embodiment (first embodiment) of the invention.

The control device 12 includes an input unit 111, an output unit 112, a storage unit 113, and a control unit 114.

The control unit 114 includes an information acquisition unit 131, a determination unit 132, and a robot control unit 133.

The input unit 111 inputs information from the outside. For example, the input unit 111 includes an operation unit such as a keyboard or a mouse and inputs information suitable for content of an operation performed by a user (person) using the operation unit.

The output unit 112 outputs information to the outside. For example, the output unit 112 displays and outputs information on a display unit. The display unit is, for example, a display device that has a screen, and displays and outputs information on the screen. As another example, the output unit 112 may output information in another aspect. For example, the output unit 112 outputs information by a sound (including a sound).

The storage unit 113 stores information. For example, the storage unit 113 stores a control program and information of various parameters used by the control unit 114. As another example, the storage unit 113 may store any information. For example, the storage unit 113 may store information such as an image used to control the robot 11.

The control unit 114 performs various kinds of control in the control device 12. The control unit 114 is configured using a central processing unit (CPU) and performs various kinds of control based on the control program and the information of various parameters stored in the storage unit 113.

The information acquisition unit 131 acquires information. For example, the information acquisition unit 131 acquires information input by the input unit 111 or one or more of information stored in the storage unit 113.

The determination unit 132 performs a predetermined determination process based on the information acquired by the information acquisition unit 131.

The robot control unit 133 controls an operation of the robot 11. Specifically, the robot control unit 133 controls an operation of the manipulator M1 by communicating with the manipulator M1 via the cable 13. The robot control unit 133 controls an operation of the end effector E1 by communicating with the end effector E1 via the cable 13.

Operation Performed by Robot

In the embodiment, the control device 12 controls the robot 11 to perform a job of inserting the insertion object 71 into the hole 91 formed in the support 81 for assembly by moving the insertion object 71 held by the robot 11.

A position and an orientation of the insertion object 71 (or another object) held by the end effector E1 of the robot 11 may be understood based on, for example, information regarding a position and an orientation of a tool center point (TCP) set in the robot 11.

Figure 3:
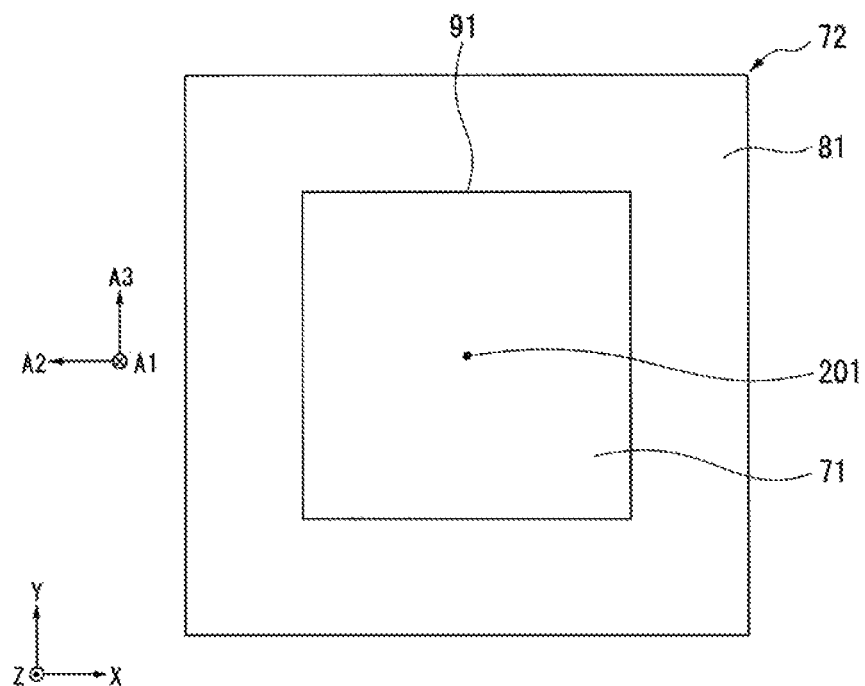
FIG. 3 is a diagram illustrating a schematic exterior of an inserted object into which an insertion object is inserted according to the embodiment (first embodiment) of the invention.

FIG. 3 is a diagram illustrating a schematic exterior of the inserted object 72 into which the insertion object 71 is inserted according to the embodiment (first embodiment) of the invention. In FIG. 3, the X-Y-Z coordinate axes and the A1-A2-A3 coordinate axes illustrated in FIG. 1 are illustrated.

In the embodiment, the negative direction of the Z axis is the direction of the gravity and is the downward direction. The positive direction of the Z axis is the upward direction.

In the embodiment, the surface of the table 51 in the upward direction and the support 81 placed on the surface each have a surface parallel to the XY plane. The hole 91 is formed on the surface of the support 81 in the upward direction.

In the embodiment, the hole 91 has a shape similar to the insertion object 71 and is slightly larger than the insertion object 71. That is, when the insertion object 71 is inserted into the hole 91, the insertion object 71 is fitted in the hole 91.

In the embodiment, the fitting is an aspect of inserting and is assumed to be included in the inserting. That is, in the embodiment, the inserting can also necessarily include non-fitting.

The insertion object 71 and the hole 91 have a rectangular shape when viewed in the direction of the Z axis and have a square shape in the embodiment. In the embodiment, the support 81 also has a rectangular shape when viewed in the direction of the Z axis and has a square shape in the embodiment. However, the support 81 may have any shape.

In FIG. 3, a central position 201 of the rectangle of the hole 91 when viewed in the direction of the Z axis is illustrated. In the state in which the insertion object 71 is inserted into the hole 91, a central position of the rectangle of the insertion object 71 also matches the central position 201 of the rectangle of the hole 91 when viewed in the direction of the Z axis.

An operation of inserting the insertion object 71 into the hole 91 of the inserted object 72 for assembly by the robot 11 will be described with reference to FIGS. 4 to 7 and 8. In FIGS. 4 to 7, the X-Y-Z coordinate axes and the A1-A2-A3 coordinate axes illustrated in FIG. 1 are illustrated.

FIGS. 4 to 7 are diagrams illustrating an example of an operation of inserting the insertion object 71 into the hole 91 of the inserted object 72 for assembly by the robot 11 according to the embodiment (first embodiment) of the invention.

Here, in FIGS. 4 to 7, to easily view the drawings, the robot 11 holding the insertion object 71 is not illustrated (in particular, the end effector E1 is not illustrated).

Figure 8:
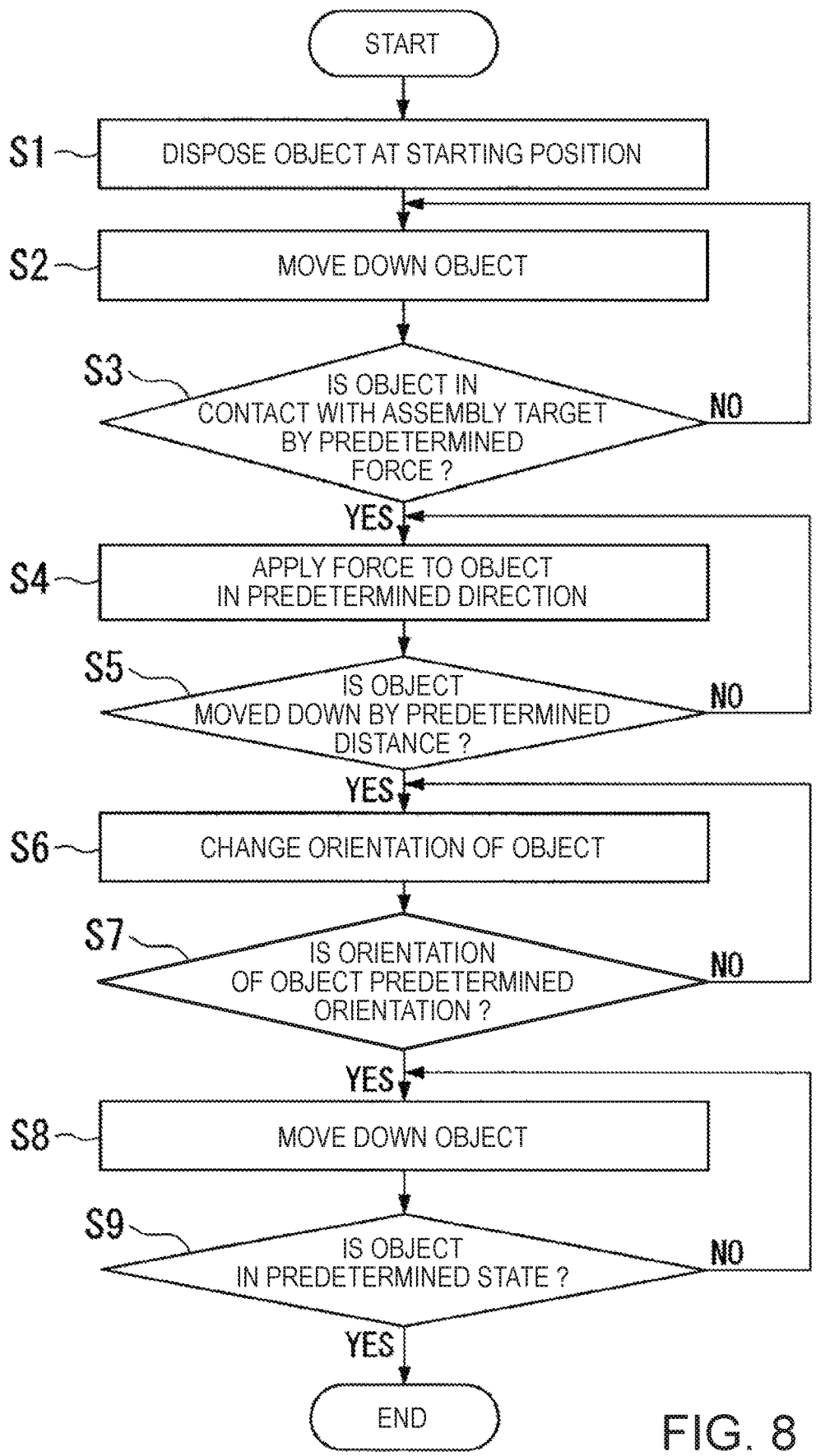
FIG. 8 is a diagram illustrating an example of a procedure of a process performed by the robot according to the embodiment (first embodiment) of the invention.

FIG. 8 is a diagram illustrating an example of a procedure of a process performed by the robot 11 according to the embodiment (first embodiment) of the invention.

In the embodiment, the insertion object 71 is used as an object held by the end effector E1 of the robot 11. The inserted object 72 (or the hole 91 of the inserted object 72) is used as a target (assembly target) in which the object is assembled.

In the embodiment, schematically, in a process of (step S1) to (step S3), an operation (first contacting operation) of bringing the insertion object 71 into contact with the inserted object 72 at a predetermined spot (predetermined portion) is performed. In a process of (step S4) to (step S5), an operation (second contacting operation) of bringing the insertion object 71 into contact with the inserted object 72 at a different spot (different portion) is performed. In a process of (step S6) to (step S7), an operation (orientation changing operation) of changing relative orientations of the insertion object 71 and the inserted object 72 is performed. In a process of (step S8) to (step S9), an operation (inserting operation) of inserting the insertion object 71 into the inserted object 72 is performed.

In the embodiment, in the first contacting operation, contacting in the direction A1 is performed. In the second contacting operation, contacting in one or both of the directions A2 and A3 is performed.

In the embodiment, it is assumed that the insertion object 71 is held by the end effector E1 of the robot 11. When the insertion object 71 is not held by the end effector E1 of the robot 11, the control device 12 may cause the robot control unit 133 to control the robot 11 such that the insertion object 71 is held by the end effector E1 of the robot 11.

In the embodiment, the inserted object 72 is assumed to be installed on the upward surface of the table 51. When the inserted object 72 is not installed on the upward surface of the table 51, the control device 12 may cause the robot control unit 133 to control the robot 11 such that the inserted object 72 is held and moved by the end effector E1 of the robot 11 to install the inserted object 72 on the upward surface of the table 51.

In the example of FIGS. 4 to 7, with regard to a surface Q1 facing the upward surface of the support 81 (or the upward surface of the inserted object 72) among a plurality of surfaces of the insertion object 71, the direction A1 is a direction perpendicular to the surface Q1 and is equivalent to a direction in which the insertion object 71 approaches the inserted object 72, and the direction A2 is parallel to the surface Q1 and is equivalent to a direction from a point most distant from the inserted object 72 to a point closest to the inserted object 72 on the surface Q1.

In the example of FIGS. 4 to 7, the direction A3 is equivalent to the direction of the Y axis, the directions A1 and A2 are respectively equivalent to the Z and X axes when the X-Y-Z coordinate system is rotated around the Y axis.

FIGS. 4 to 7 are diagrams illustrating an example of an operation of inserting the insertion object 71 into the hole 91 of the inserted object 72 for assembly by the robot 11 according to an embodiment of the invention.

Here, in FIGS. 4 to 7, to easily view the drawings, the robot 11 holding the insertion object 71 is not illustrated (in particular, the end effector E1 is not illustrated).

Step S1

The control device 12 causes the robot control unit 133 to control the robot 11 such that the insertion object 71 held by the end effector E1 of the robot 11 is disposed at a predetermined position (starting position).

Here, the control device 12 may ascertain the position of the inserted object 72, for example, by giving an instruction in advance from a user or the like or may measure and ascertain the position of the inserted object 72 based on information regarding an image captured by the imaging device 21.

Figure 4:
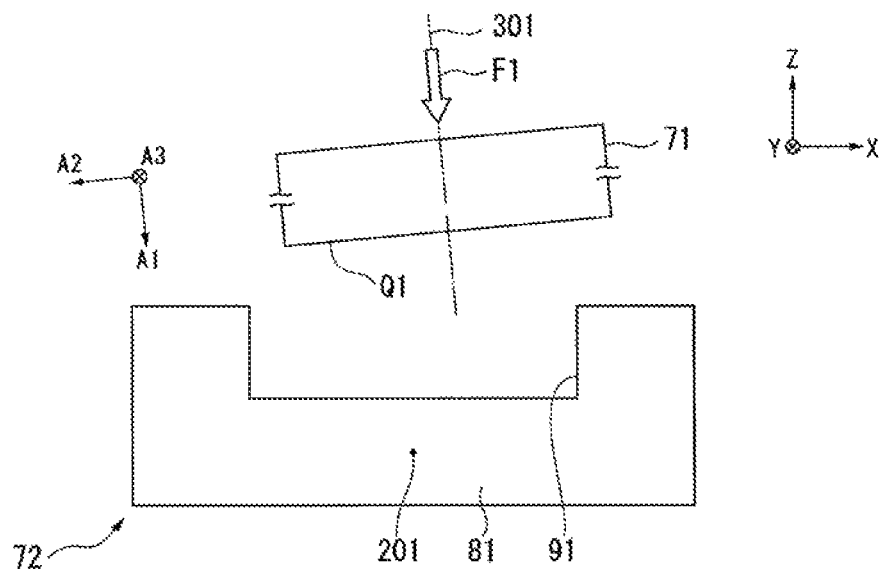
FIG. 4 is a diagram illustrating an example of an operation of inserting an insertion object into a hole of an inserted object for assembly by a robot according to the embodiment (first embodiment) of the invention.

FIG. 4 illustrates a state in which the insertion object 71 is disposed at the starting position.

In this state, as the relative positions and orientations of the insertion object 71 and the inserted object 72, the surface Q1 facing the upward surface of the support 81 (or the upward surface of the inserted object 72) among the plurality of surfaces of the insertion object 71 is sloped (that is, not parallel to) with respect to the XY plane. In the example of FIG. 4, when viewed in the positive direction of the Y axis, a distance between the surface Q1 of the insertion object 71 and the upward surface of the support 81 (or the upward surface of the inserted object 72) in the Z direction is greater in a portion in the positive direction of the X axis than in a portion in the negative direction of the X axis. As the degree of the slope (tilting), for example, any slope may be used as long as the insertion object 71 can be inserted into the inserted object 72. For example, the slope is preferably set to be less than 45 (=90/2) degrees since a probability that the insertion object 71 is inserted into the inserted object 72 can be improved.

In the example of FIG. 4, the slope is equivalent to a slope between a direction from the positive side to the negative side of the Z axis and the direction A1 (a direction from the negative side to the positive side).

In this state, the insertion object 71 is located above the upward surface of the support 81 (or the upward surface of the inserted object 72) by a predetermined distance (a different distance in accordance with a position on the X axis because of being sloped) in the direction of the Z axis. The predetermined distance may be set to any distance. For example, 50 [mm] or about this distance may be used at the central position in the X axis direction.

In this state, for example, on the surface parallel to the XY plane, the position of the center of the rectangular shape of the insertion object 71 (the position of the center on the surface Q1) matches the central position 201 of the inserted object 72 or is near the central position 201.

Step S2

The control device 12 causes the robot control unit 133 to control the robot 11 such that the insertion object 71 held by the end effector E1 of the robot 11 is moved (moved down) in a direction (obliquely downward) which is a direction (the direction A1) perpendicular to the surface Q1 and the insertion object 71 approach the inserted object 72.

Here, FIG. 4 illustrates a central axis 301 perpendicular to the surface Q1 of the insertion object 71 and a force F1 applied to the insertion object 71 in the direction (the direction A1) oriented along the central axis 301. In the embodiment, the force F1 is applied so that the whole insertion object 71 is moved in the direction of the force F1. For example, the force F1 can be understood to be substantially applied to the center of gravity of the insertion object 71.

In the embodiment, the control device 12 causes the robot control unit 133 to control the robot 11 such that the insertion object 71 is moved while maintaining the slope of the insertion object 71 with respect to the inserted object 72.

As another example, the control device 12 may cause the robot control unit 133 to control the robot 11 such that the insertion object 71 held by the end effector E1 of the robot 11 is moved (moved down) in a different direction to approach the insertion object 71 to the inserted object 72, for example, the insertion object 71 is moved (moved down) downwards (the negative direction of the Z axis).

Here, in the embodiment, the control device 12 causes the robot control unit 133 to control the robot 11 such that when the insertion object 71 is moved to bringing the insertion object 71 into contact with the inserted object 72, the insertion object 71 is moved so that the insertion object 71 is moved so that one side (in the example of FIG. 4, the right side) of the surface Q1 of the insertion object 71 comes into contact with the inserted object 72 (in the example of FIG. 4, a right portion which is a portion in which the hole 91 is not formed) and the other side (in the example of FIG. 4, the left side) of the surface Q1 of the insertion object 71 does not come into contact with the inserted object 72 (in the example of FIG. 4, a left portion which is a portion in which the hole 91 is not formed) when the viewed from the negative direction to the positive direction of the Y axis. That is, the control device 12 performs the control such that the distal end of the foregoing other side (in the example of FIG. 4, the left side) of the surface Q1 of the insertion object 71 enters in the hole 91 of the inserted object 72.

Step S3

The control device 12 causes the determination unit 132 to determine whether the insertion object 71 is in contact with the inserted object 72 by a predetermined force.

When the determination unit 132 determines that the insertion object 71 is in contact with the inserted object 72 by the predetermined force (YES in step S3), the control device 12 causes the robot control unit 133 to stop the insertion object 71 held by the end effector E1 of the robot 11 by controlling the robot 11. Then, the process proceeds to (step S4).

Conversely, when the determination unit 132 determines that the insertion object 71 is not in contact with the inserted object 72 by the predetermined force (NO in step S3), the control device 12 continues the process of (step S2).

Here, the determination unit 132 determines whether the insertion object 71 is in contact with the inserted object 72 by the predetermined force based on information regarding a measurement result of the force measurement unit 32 acquired by the information acquisition unit 131. The predetermined force may be any force. For example, 10 [N] or about 10 [N] may be used in a movement direction of the insertion object 71 (in the example of FIG. 4, the direction A1 and the direction of the force F1). In this case, for example, when the movement direction of the insertion object 71 is assumed to be a positive direction of the force, the predetermined force is +10 [N] or about +10 [N] and a target value (target force) of the measurement result of the force measurement unit 32 is −10 [N] or about −10 [N].

In the embodiment, in the process of (step S2) to (step S3), the control device 12 validates only force control on the force (in the example of FIG. 4, the force F1) in the movement direction (the direction A1) of the insertion object 71 in the process for the force control in which the information regarding the measurement result of the force measurement unit 32 is used.

As another example, the force control on the torque A1 may be performed. In this case, for example, it is also possible to make comparison with the magnitude (absolute value) of the target force in the direction A1, set the magnitude (absolute value) of the target force of the torque A1 to be small, and efficiently perform the first contacting operation.

Step S4

The control device 12 causes the robot control unit 133 to control the robot 11 such that a force F11 in a direction oriented along the central axis 301 (the direction A1) and forces in a direction perpendicular to the central axis 301 (a force F12 in the direction A2 and a force F13 in the direction A3) are applied to the insertion object 71 head by the end effector E1 of the robot 11.

In the embodiment, the force F12 is a force in a direction (the direction A2) from a point at which a distance oriented from the support 81 (or the inserted object 72) is the maximum on the surface Q1 to a point at which the distance from the support 81 (or the inserted object 72) on the surface Q1 is the minimum. The force F13 is a force in the direction (the direction A3) perpendicular to the force F11 and the force F12.

Here, the force F12 and the force F13 may each be any force. For example, 10 [N] or about 10 [N] may be used as in the case of the process of (step S3).

Figure 5:
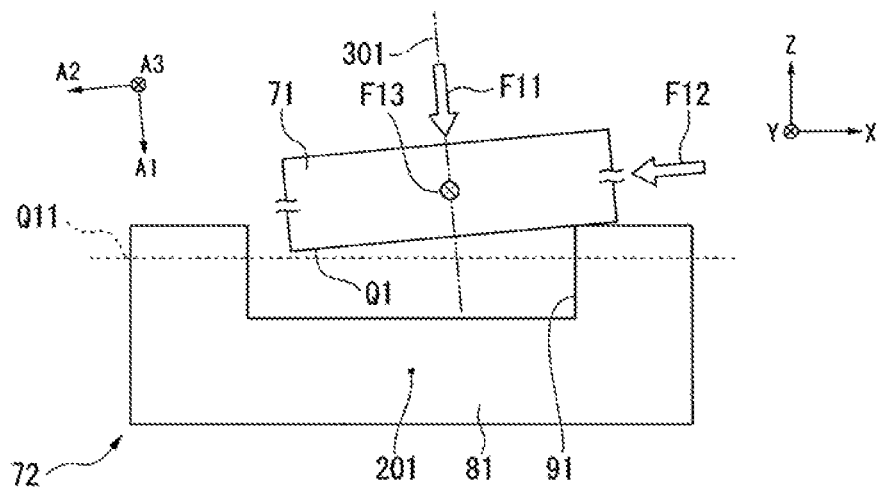
FIG. 5 is a diagram illustrating the example of the operation of inserting the insertion object into the hole of the inserted object for assembly by the robot according to the embodiment (first embodiment) of the invention.

FIG. 5 illustrates a state in which the force F11, the force F12, and the force F13 are applied to the insertion object 71.

FIG. 5 illustrates a surface (for example, an imaginary surface Q11) below (slightly below) the upper surface of the inserted object 72 (the surface of a portion not corresponding to the hole 91).

In the example of FIG. 5, in the direction A2, one side (in the example of FIG. 5, the right side) of the insertion object 71 comes into contact with the inserted object 72 in the first contacting operation, and subsequently the other side (in the example of FIG. 5, the left side) of the insertion object 71 comes into contact with the inserted object 72 in the second contacting operation.

In the embodiment, the force F11, the force F12, and the force F13 are each applied so that the whole insertion object 71 is moved in a direction of the forces (the direction of the force F11 and the direction of the force F12 or the force F13), and thus, for example can be understood to be applied substantially to the center of gravity of the insertion object 71.

Step S5

The control device 12 causes the determination unit 132 to determine whether the insertion object 71 is moved down by a predetermined distance compared to the state in which the insertion object 71 comes into contact with the inserted object 72 (for example, the state of the transition from the process of step S3 to the process of step S4).

When the determination unit 132 determines that the insertion object 71 is moved down by the predetermined distance (YES in step S5), the control device 12 stops the downward movement of the insertion object 71. Then, the process proceeds to (step S6).

Conversely, when the determination unit 132 determines that the insertion object 71 is not moved down by the predetermined distance (NO in step S5), the control device 12 continues the process of (step S4).

Here, the predetermined distance may be any distance. For example, 10 [mm] or about 10 [mm] may be used. The predetermined distance may be, for example, a distance that can be different depending on a position in the direction of the X axis (a distance with a range).

In the embodiment, in the process of (step S4) to (step S5), the control device 12 validates the force control on the direction (the direction A1) of the force F11, the direction (the direction A2) of the force F12, the direction (the direction A3) of the force F13, and the moment (the torque A1) of rotation around the direction A1 in the process for the force control in which the information regarding the measurement result of the force measurement unit 32 is used. As the target force, for example, −10 [N], −10 [N], +10[N] or −10 [N], and 0 [N] are used for the direction A1, the direction A2, the direction A3, and the torque A1, respectively. In this example, it is also possible to make comparison with the magnitude (absolute value) of the target force in the direction A1, set the magnitude (absolute value) of the target force of the torque A1 to be small, and efficiently perform the second contacting operation.

Here, in the embodiment, the force control in the direction A3 may be performed for a positive (+) target force or may be performed for a negative (−) target force. As another example, the force control in the direction A3, the target force may be set to zero. As still another example, the force control in the direction A3, the target force may not be performed.

In this way, in the embodiment, the control device 12 performs a copying operation in a predetermined torque direction (in the embodiment, the torque A1) when the insertion object 71 is inserted into the inserted object 72 by the robot 11. Thus, the control device 12 causes the robot 11 to press the insertion object 71 while bringing the insertion object 71 into contact with the inserted object 72 in the direction A1, the direction A2, or the direction A3 in a free state in a predetermined torque direction (in the embodiment, the torque A1).

In the embodiment, in the process of (step S4) to (step S5), the copying operation is performed using the force control.

In the embodiment, the force oriented to the side on which the insertion object 71 is tilted (in the example of FIG. 5, the force F12 in the direction A2) is applied so that the insertion object 71 is pressed against the side surface of the inside of the hole 91 (the insertion port) of the inserted object 72.

Step S6

The control device 12 causes the robot control unit 133 to control the robot 11 such that the orientation of the insertion object 71 held by the end effector E1 of the robot 11 is changed. As the change in the orientation, an aspect is used in which the orientation of the insertion object 71 is changed so that the surface (in the embodiment, the surface Q1) with the rectangular shape of the insertion object 71 is parallel to the XY plane. That is, as the change in the orientation, an aspect is used in which the orientation of the insertion object 71 is changed to a state after the insertion (in the embodiment, the same applies to a state after assembly).

In the embodiment, the control device 12 causes the robot control unit 133 to control the robot 11 such that the insertion object 71 is rotated with a rotational force R1 while applying a force F21 in the direction (the direction A1) along the central axis 301 and forces in directions perpendicular to the central axis 301 (a force F22 in the direction A2 and a force F23 in the direction A3) to the insertion object 71 held by the end effector E1 of the robot 11. The direction of the rotation is a direction of rotation by which a direction of a straight line perpendicular to the surface Q1 of the insertion object 71 (the direction of the central axis 301) matches the direction of the Z axis (there are two directions of the rotation, but a direction of the rotation by which the direction of a straight line perpendicular to the surface Q1 matches the direction of the Z axis by rotation equal to or less than 90 degrees).

In the embodiment, the force F22 has a direction from a point at which a distance oriented from the inserted object 72 (here, the bottom of the hole 91) is the maximum on the surface Q1 to a point at which the distance from the inserted object 72 (here, the bottom of the hole 91) on the surface Q1 is the minimum.

Figure 6:
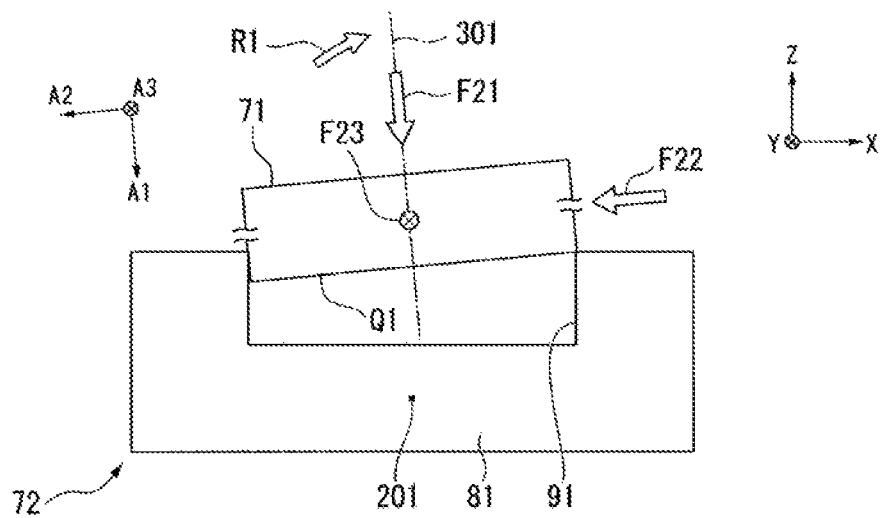
FIG. 6 is a diagram illustrating the example of the operation of inserting the insertion object into the hole of the inserted object for assembly by the robot according to the embodiment (first embodiment) of the invention.

FIG. 6 illustrates a state in which the force F21, the force F22, and the force F23 are applied to the insertion object 71 and the predetermined rotational force R1 (a force of a moment) is applied to the insertion object 71. In the embodiment, the orientation of the insertion object 71 is changed while the insertion object 71 is pressed against the side surface of the inside of the hole 91 (the insertion port) of the inserted object 72.

In the embodiment, the force F21, the force F22, and the force F23 are each applied so that the whole insertion object 71 is moved in a direction of the forces (the direction of the force F21, the force F22, or the force F23), and thus, for example can be understood to be applied substantially to the center of gravity of the insertion object 71.

The force F21, the force F22, and the force F23 are each any force. For example, 10 [N] or about 10 [N] may be used.

In this case, instead of the configuration in which the copying control is performed through the force control, a configuration in which position control is performed may be used as another configuration example. In general, a process until completion of the control is faster in the position control than the force control.

Step S7

The control device 12 causes the determination unit 132 to determine whether the orientation of the insertion object 71 is a predetermined orientation. As the predetermined orientation, an orientation at which the surface (in the embodiment, the surface Q1) with the rectangular shape of the insertion object 71 is parallel to the XY plane is used.

When the determination unit 132 determines that the orientation of the insertion object 71 becomes the predetermined orientation (YES in step S7), the control device 12 stops the operation of changing the orientation of the insertion object 71. Then, the process proceeds to step S8.

Conversely, when the determination unit 132 determines that the orientation of the insertion object 71 does not become the predetermined orientation (NO in step S7), the control device 12 continues the process of step S6.

In the embodiment, in the process of (step S6) to (step S7), the control device 12 performs the process for the same force control as that of the process of (step S4) to (step S5).

Step S8

The control device 12 causes the robot control unit 133 to control the robot 11 such that the insertion object 71 held by the end effector E1 of the robot 11 is moved (moved down) downwards.

In this case, for example, the copying control may be performed through the force control or the position control may be performed.

Step S9

The control device 12 causes the determination unit 132 to determine whether the insertion object 71 enters a predetermined state. The predetermined state may be, for example, a state in which the insertion object 71 is in contact with the inserted object 72 (here, the bottom of the hole 91) by a predetermined force, or another state may be used. The predetermined force may be any force. For example, 20 [N] or about 20 [N] in the Z axis direction may be used. In this case, for example, when a direction oriented from the positive side to the negative side of the Z axis is assumed to be a positive direction, the predetermined force is +20 [N] or about +20 [N]. The target value (target force) of the measurement result of the force measurement unit 32 is −20 [N] or about −20 [N].

In the embodiment, the control device 12 causes the robot 11 to perform the force control on, for example, the direction A1, the direction A2, the direction A3, the torque A1, the torque A2, and the torque A3. In this case, as the target force, for example, −20 [N], 0 [N], 0 [N], 0 [N], 0 [N], and 0 [N] are used for the direction A1, the direction A2, the direction A3, the torque A1, the torque A2, and the torque A3. In this example, the magnitude (the absolute value) of the target force in the direction A2 and magnitude (the absolute value) of the target force in the direction A3 are set to be less than the magnitude (the absolute value) of the target force in the direction A1, and thus it is possible to efficiently perform the inserting operation. In this example, the magnitude (the absolute value) of the target force in the torque A1 is set to be less than the magnitude (the absolute value) of the target force in the direction A1, and thus it is possible to efficiently perform the inserting operation.

In the embodiment, in a job stage of (step S9), the direction A1, the direction A2, and the direction A3 are a direction parallel to the Z axis, a direction parallel to the X axis, and the direction parallel to the Y axis, respectively.

When the determination unit 132 determine that the insertion object 71 enters the predetermined state (YES in step S9), the control device 12 stops the insertion object 71. Then, the process of the flow ends.

Conversely, when the determination unit 132 determines that the insertion object 71 does not enter the predetermined state (NO in step S9), the control device 12 continues the process of step S8.

Figure 7:
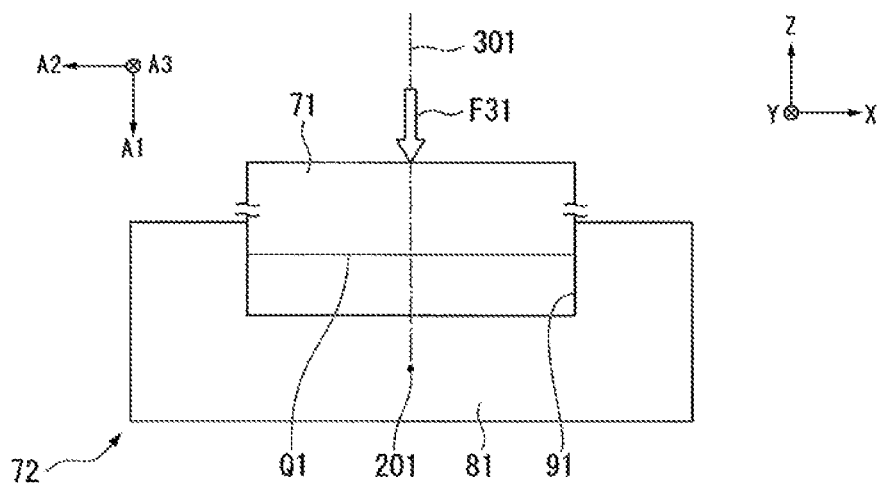
FIG. 7 is a diagram illustrating the example of the operation of inserting the insertion object into the hole of the inserted object for assembly by the robot according to the embodiment (first embodiment) of the invention.

FIG. 7 illustrates a state in which s force F31 in the direction A1 (in the job stage of FIG. 7, a direction from the positive side to the negative side of the Z axis) is applied to the insertion object 71 and the insertion object 71 is in contact with the inserted object 72 (here, the bottom of the hole 91). In the example of FIG. 7, a state in which the lower surface of the insertion object 71 is in contact with a surface above the bottom of the hole 91 is illustrated.

As the predetermined state of the insertion object 71, a state in which the lower surface of the insertion object 71 is in contact with a surface (for example, an imaginary surface) above (for example, slightly above) the bottom of the hole 91 may be used as another example.

Figures 9, 10:
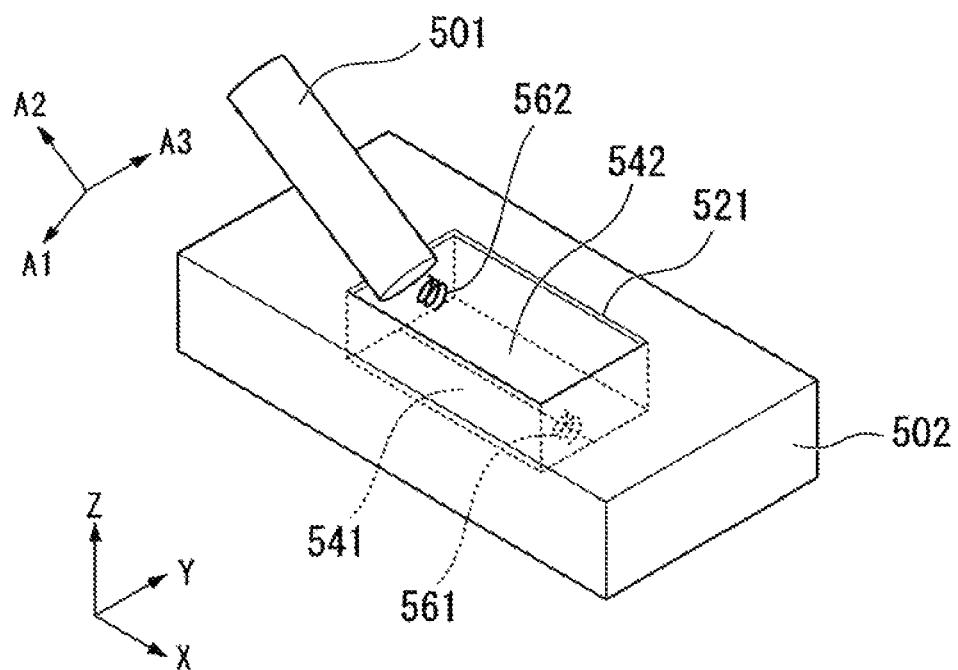
FIG. 9 is a diagram illustrating examples of cycle times of a suggestion configuration and a comparative configuration according to the embodiment (first embodiment) of the invention.
FIG. 10 is a diagram illustrating a schematic exterior of an insertion object and an inserted object according to an embodiment (second embodiment) of the invention.

FIG. 9 is a diagram illustrating examples of cycle times in a suggestion configuration and a comparative configuration according to the embodiment (first embodiment) of the invention.

FIG. 9 illustrates examples of cycle times [second] at predetermined deviations (Q/P) [mm] in the suggestion configuration and a comparative configuration. In the embodiment, Q indicates a deviation amount in the direction A3 and P indicates a deviation amount in the direction A2. That is, in the embodiment, the deviation amount (Q/P) [mm] indicates a (deviation amount in the direction A3/deviation amount in the direction A2) at a contact position of the insertion object 71 with the hole 91 of the inserted object 72.

Here, the suggestion configuration indicates that a configuration according to the embodiment is used.

The cycle time indicates a time necessary for a job performed once (in the embodiment, the process of the processing flow illustrated in FIG. 8).

In the comparative configuration, a configuration is used in which an insertion object is inserted into an inserted object by causing the lower surface of the insertion object to be parallel to the upper surface of the inserted object, moving down the insertion object, bringing the insertion object in contact with the inserted object, subsequently rotating the insertion object around a line perpendicular to the upper surface of the inserted object while applying a downward force to the insertion object.

In the example of FIG. 9, in the comparative example, "NG" indicates a case (a timeout case) in which the insertion object has not been inserted into the inserted object even when the insertion object is rotated 10 times as the rotation.

In the example of FIG. 9, for example, when the deviation amount is "0 [mm]/0 [mm]", the cycle time is "5.429 [seconds]" in the comparative configuration and the cycle time is "4.053 [seconds]" in the suggestion configuration. In the example of FIG. 9, for example, when the deviation amount is "1.5 [mm]/1.5 [mm]", the cycle time is "50.119 [seconds]" in the comparative configuration and the cycle time is "4.924 [seconds]" in the suggestion configuration. In the example of FIG. 9, other deviation amounts are also illustrated.

As illustrated in FIG. 9, the cycle time is shorter and more efficient in the suggestion configuration than in the comparative configuration as a whole.

Conclusion of First Embodiment

As described above, in the control device 12, the robot 11, and the robot system 1 according to the embodiment, the control device 12 can control the robot 11 such that a job of inserting the insertion object 71 into the inserted object 72 is efficiently performed without performing a probing operation.

In the control device 12, the robot 11, and the robot system 1 according to the embodiment, the insertion object 71 is brought into contact with the inserted object 72 with the insertion object 71 being tilted with respect to the inserted object 72 as in the example of FIG. 4. For example, when the insertion object 71 is moved down without being tilted with respect to the inserted object 72, a situation in which the insertion object 71 is stranded and may not be inserted into the inserted object 72 can occur. In the embodiment, however, it is possible to suppress (ideally prevent) occurrence of this situation.

In the control device 12, the robot 11, and the robot system 1 according to the embodiment, as in the example of FIG. 5, after the insertion object 71 is brought into contact with the inserted object 72, the force F11 is applied to the insertion object 71 in the direction (the direction A1) perpendicular to the tilted surface (the surface Q1) to press the insertion object 71 and the force F12 is applied to the insertion object 71 in the direction oriented along the tilting to press the insertion object 71 (in the embodiment, the direction A2 from the point most distant from the inserted object 72 to the point closest to the inserted object 72). Further, in the embodiment, the force F13 is applied to the insertion object 71 to press the insertion object 71 in another direction (in the embodiment, the direction A3) oriented along the tilting. Thus, in the control device 12, the robot 11, and the robot system 1 according to the embodiment, it is possible to insert the insertion object 71 into the inserted object 72 for assembly while pressing the insertion object 71 against the surface of the inside of the hole 91 of the inserted object 72. Thus, it is possible to shorten a time necessary until the insertion (in the embodiment, assembly). That is, it is possible to insert the insertion object 71 into the inserted object 72 quickly.

In the embodiment, for example, fitting used as the assembly.

In the control device 12, the robot 11, and the robot system 1 according to the embodiment, as in the example of FIG. 6, after a part of the insertion object 71 is put (inserted) into the inserted object 72 (in the example of FIG. 6, the hole 91), the force F21 is applied to the insertion object 71 in the direction (the direction A1) perpendicular to the tilted surface (the surface Q1) to press the insertion object 71 and the force F22 is further applied to the insertion object 71 to press the insertion object 71 in the direction oriented along the tilting (in the embodiment, the direction A2 from the point most distant from the inserted object 72 to the point closest to the inserted object 72). Further, in the embodiment, while applying the force F23 to the insertion object 71 to press the insertion object 71 in another direction (in the embodiment, the direction A3) oriented along the tilting, the insertion object 71 is moved (rotated) at the orientation after the assembly. Thus, in the control device 12, the robot 11, and the robot system 1 according to the embodiment, it is possible to insert the other portion (the whole insertion object 71 is inserted into the inserted object 72 to be assembled in the embodiment) while maintaining this state without disengaging the state in which the part of the insertion object 71 is inserted into the inserted object 72 (in the example of FIG. 6, the hole 91).

In this way, in the control device 12, the robot 11, and the robot system 1 according to the embodiment, it is possible to efficiently perform the operation of changing the orientation of the insertion object 71.

In the control device 12, the robot 11, and the robot system 1 according to the embodiment, for example, it is possible to assembly the object with high precision even when positional deviation occurs in the objects to be assembled. Here, when there is allowance (gap) between the objects to be assembled, positional deviation can occur in the objects to be assembled. However, in the control device 12, the robot 11, and the robot system 1 according to the embodiment, it is possible to compensate for the positional deviation and it is possible to realize the assembly of the objects.

In this way, in the control device 12, the robot 11, and the robot system 1 according to the embodiment, the work inserting job can be realized without performing a probing operation. Therefore, it is possible to accelerate the job.

In the control device 12, the robot 11, and the robot system 1 according to the embodiment, it is possible to realize the work inserting job in a general-purpose work.

Here, in the embodiment, when the process of (step S3) transitions to the process of (step S4), the control device 12 does not change the orientation of the insertion object 71 held by the robot 11. As another example, the control device 12 may cause the robot control unit 133 to control the robot 11 such that the orientation of the insertion object 71 held by the robot 11 (the relative orientations of the insertion object 71 and the inserted object 72) is changed, for example, an angle of the tilting of the insertion object 71 is changed with respect to the inserted object 72. As the degree of the slope (tilting), for example, any angle may be set as long as, for example, the insertion object 71 is inserted into the inserted object 72. For example, when the angle is less than 45 (=90/2) degrees, it is possible to improve reliability that the insertion object 71 is inserted into the inserted object 72, which is preferable.

In the embodiment, in the process (the example of FIG. 5) of (step S4) to (step S5) and the process (the example of FIG. 6) of (step S6) to (step S7), the forces F13 and F23 in the direction A3 are applied to the insertion object 71 by the robot 11 along with the force F12 and the force F22 in the direction A2. As another configuration example, the force F13 and the force F23 in the direction A3 may not be applied. That is, the force F13 and the force F23 in the direction A3 may be zero.

In the embodiment, since the insertion object 71 is cubic, it is considered that the force F13 and the force F23 (that is, components of forces on two surfaces of the cubic shape) in the direction A3 are more preferably applied to the insertion object 71 along with the force F12 and the force F22 in the direction A2 in terms of efficiency of the inserting job. Thus, for example, when the insertion object 71 is cylindrical (the surface Q1 is circularly cylindrical), the efficiency of the inserting job is considered to be better than in the case of the insertion object 71 which is cubic even when the force F13 and the force F23 in the direction A3 are not applied.

For the target force of which the magnitude (absolute value) is greater than, for example, 0 [N] in regard to the component of each direction or each torque in each force control, any magnitude (absolute value) greater than 0 [N] may be used.

As the direction or the torque in which the force control is performed and the target force of each direction or each torque, various aspects may be used in addition to the aspects described in the embodiment. In the embodiment, the X-Y-Z coordinate system or the A1-A2-A3 coordinate system has been used as the coordinate system, but any coordinate system may be used.

Aspect Example in which Inserted Object is Held

In the embodiment, the job of inserting the insertion object 71 into the inserted object 72 by causing the robot 11 to hold and move the insertion object 71 has been described. As another example, a job of inserting the insertion object 71 into the inserted object 72 by causing the robot 11 to hold and move the inserted object 72 may be performed. For example, even when the insertion object 71 is held by the robot 11 or even when the inserted object 72 is held by the robot 11, it is possible to realize the same job result by performing the job of causing the relative positional relation and orientation relation between the insertion object 71 and the inserted object 72 to be similar to be each other.

For example, directions (for example, movement directions or directions of the forces) of the operation are reversed for the objects held by the robot 11 between when the insertion object 71 is held by the robot 11 and when the inserted object 72 is held by the robot 11.

Aspect Example in which Both Insertion Object and Inserted Object can be Moved

The aspect in which one of the insertion object 71 and the inserted object 72 can be moved by the robot 11 has been described above. As another example, an aspect in which both the insertion object 71 and the inserted object 72 can be moved may be used. In this case, for example, one of the insertion object 71 and the inserted object 72 can be held and moved by the robot 11 and the other thereof can be moved by a movement mechanism other than the robot 11. Alternatively, one of the insertion object 71 and the inserted object 72 can be held and moved by the robot 11 and the other thereof can be held and moved by another robot. For example, one robot including two or more holding units may be used and the insertion object 71 and the inserted object 72 may each be held and moved by the different holding units of the robot.

Configuration Example

As one configuration example, a control device (in the example of FIG. 1, the control device 12) controls a robot (in the example of FIG. 1, the robot 11) including a movable unit (in the example of FIG. 1, the manipulator M1) in which a force measurement unit (in the example of FIG. 1, the force measurement unit 32) and a holding unit (in the example of FIG. 1, the end effector E1) are installed. The control device includes a control unit (in the example of FIG. 2, the control unit 114) that is capable of controlling the movable unit such that the first contacting operation of setting an insertion object (in the example of FIGS. 4 to 7, the insertion object 71) held by the holding unit to a first orientation (for example, the orientation illustrated in FIG. 4) and bringing the insertion object into contact with an inserted object (in the example of FIGS. 4 to 7, the inserted object 72) having an insertion port (in the example of FIGS. 4 to 7 the insertion port of the hole 91) is performed, and subsequently an inserting operation of setting the insertion object to a second orientation (for example, the orientation illustrated in FIG. 7) different from the first orientation into the insertion port and inserting the insertion object into the insertion port by relatively moving the insertion object and the inserted object in a first direction (in the example of FIG. 7, the direction A1 and a direction parallel to the Z axis) is performed. Between the first contacting operation and the inserting operation, the control unit performs a second contacting operation of bringing the insertion object and the inserted object into contact with a portion different from a contact portion in the first contacting operation by performing force control such that a component of a target force in a second direction (in the example of FIG. 5, the direction A2) orthogonal to the first direction is set to a value greater than 0 based on an output from the force measurement unit at an orientation (for example, the orientation illustrated in FIG. 5) at which the insertion object is tilted with respect to the second orientation.

When the force control is performed such that the component of the target force in the second direction is set to a value greater than 0, another component may be used or the other component may not be set.

In the control device, as one configuration example, when the insertion object is set from the first orientation to the second orientation, the control unit performs the force control such that the component of the target force in the second direction (in the example of FIG. 6, the direction A2 in the embodiment) is set to the value greater than 0 based on the output from the force measurement unit. As the target force of the force control at this time, another aspect may be used.

In the control device, as one configuration example, in the second contacting operation, the control unit performs the force control such that a component of the target force in a third direction (in the example of FIG. 5, the direction A3) orthogonal to the first and second directions is set to a value greater than 0 based on an output from the force measurement unit. As the target force of the force control at this time, another aspect may be used.

In the control device, as one configuration example, in the inserting operation, the control unit performs the force control such that a component of the target force in the first direction (in the example of FIG. 7, the direction A1) is set to a value greater than 0 based on an output from the force measurement unit. As the target force of the force control at this time, another aspect may be used.

In the control device, as one configuration example, in the inserting operation, the control unit performs the force control such that the component of the target force in the second direction (in the example of FIG. 7, the direction A2) is less than the component of the target force in the first direction based on an output from the force measurement unit (for example, copying control is performed in the direction A2 in the embodiment). As the target force of the force control at this time, another aspect may be used.

In the control device, as one configuration example, the holding unit is rotatable around a first rotation axis. In the first contacting operation, the second contacting operation, and the inserting operation, the control unit performs the force control such that a component of the target force (in the example of FIGS. 4 to 7, the target force of the torque A1) around the first rotation axis is set to a value less than a component of the target force in the first direction based on an output from the force measurement unit (for example, the copying control is performed continuously with the torque A1). As the target force of the force control in each operation, another aspect may be used.

In the control device, as one configuration example, in the first contacting operation, the second contacting operation, and the inserting operation, the control unit performs the force control such that the component of the target force around the first rotation axis is set to 0 based on an output from the force measurement unit. As the target force of the force control in each operation, another aspect may be used.

In the control device, as one configuration example, the angle of the tilting is less than 45 degrees. Another angle of the tilting may be used.

In the control device, as one configuration example, the force measurement unit measures a force with a piezoelectric element. Another configuration may be used as the force measurement unit.

In the control device, as one configuration example, the piezoelectric element is a quartz crystal. Another object may be used as the piezoelectric element.

As one configuration example, the robot is controlled by the control device.

As one configuration example, a robot system (in the example of FIG. 1, the robot system 1) includes the control device and a robot controlled by the control device.

Second Embodiment

In the embodiment, differences from the first embodiment will be described mainly. The description of the same points as those of the first embodiment will be simplified or omitted.

In the embodiment, to facilitate the description, the same reference numerals are given to the same configurations or processes as the configurations or the processes illustrated in FIGS. 1 to 8 referred to in the description of the first embodiment.

In the embodiment, schematically, an insertion object and an inserted object used for an inserting job by the robot 11 are different compared to the first embodiment.

FIG. 10 is a diagram illustrating a schematic exterior of an insertion object 501 and an inserted object 502 according to an embodiment (second embodiment) of the invention.

FIG. 10 illustrates the same X-Y-Z coordinate axes and A1-A2-A3 coordinate axes as those of the first embodiment.

Here, in FIG. 10, to easily view the drawing, the robot 11 holding an insertion object 501 is not illustrated (in particular, the end effector E1 is not illustrated).

FIG. 10 illustrates an insertion object 501 which is a battery and an inserted object 502 including an accommodation unit that accommodates the battery. The inserted object 502 is any of various devices into which a battery is inserted and may be, for example, a remote controller.

In general, there are a plurality of sizes as the size of a battery. To facilitate the description, in the embodiment, the size of the battery is assumed to be constant.

The inserted object 502 includes a hole 521 into in which two insertion objects 501 can be inserted in parallel. The hole 521 includes an inserted portion 541 into which one insertion object 501 is inserted and an inserted portion 542 in which the other insertion object 501 is inserted. The inserted portions 541 and 542 each have an opening (insertion port). In this example, the openings are connected. The hole 521 is formed as the accommodation unit.

The inserted portion 541 includes a spring 561 at one end in the longitudinal direction. The inserted portion 542 includes a spring 562 at one end in the longitudinal direction. Here, the springs 561 and 562 adjoin a negative terminal between a positive terminal and the negative terminal of the insertion object 501 (battery).

In the embodiment, the control device 12 controls the robot 11 such that the insertion object 501 held by the end effector E1 of the robot 11 is inserted into the inserted portion 541 for assembly.

For example, when a state in which the insertion object 501 according to the embodiment is inserted into the inserted portion 541 and a state in which the insertion object 71 according to the first embodiment is inserted into the inserted object 72 are considered, the control device 12 inserts the insertion object 501 into the inserted portion 541 for assembly, as in the first embodiment, by setting disposition of the inserted object 502, a position and an orientation at which the insertion object 501 is held by the end effector E1 of the robot 11, and a job performed on the insertion object 501 held by the end effector E1 of the robot 11 (for example, the process of the processing flow illustrated in FIG. 8) so that the X-Y-Z coordinate system matches the A1-A2-A3 coordinate system.

Here, in the embodiment, there is the spring 561 in the inserted portion 541. Therefore, the control device 12 preferably first brings the insertion object 501 into contact with a side on which the spring 561 is not located between both ends of the inserted portion 541 in the longitudinal direction.

When the insertion object 501 can be inserted into the inserted portion 541, the control device 12 may perform control of an inserting job in accordance with any other scheme.

Conclusion of Second Embodiment

As described above, in the control device 12, the robot 11, and the robot system 1 according to the embodiment, the control device 12 can control the robot 11 such that a job of inserting the insertion object 501 which is a battery into the inserted object 502 which is the accommodation unit of the battery can be efficiently performed without performing a probing operation.

In the embodiment, it is possible to obtain the same advantages as those of the first embodiment.

In the embodiment, the aspect in which the insertion object 501 is held by the robot 11 has been described. As another example, an aspect in which the inserted object 502 is held by the robot 11 or an aspect in which both the insertion object 501 and the inserted object 502 are held by the robot 11 or the like may be used.

Third Embodiment

In the embodiment, differences from the first embodiment will be described mainly. The description of the same points as those of the first embodiment will be simplified or omitted.

In the embodiment, to facilitate the description, the same reference numerals are given to the same configurations or processes as the configurations or the processes illustrated in FIGS. 1 to 8 referred to in the description of the first embodiment.

Schematically, the embodiment is different from the first embodiment in an insertion object and an inserted object used for an inserting job by the robot 11.

Figure 11:
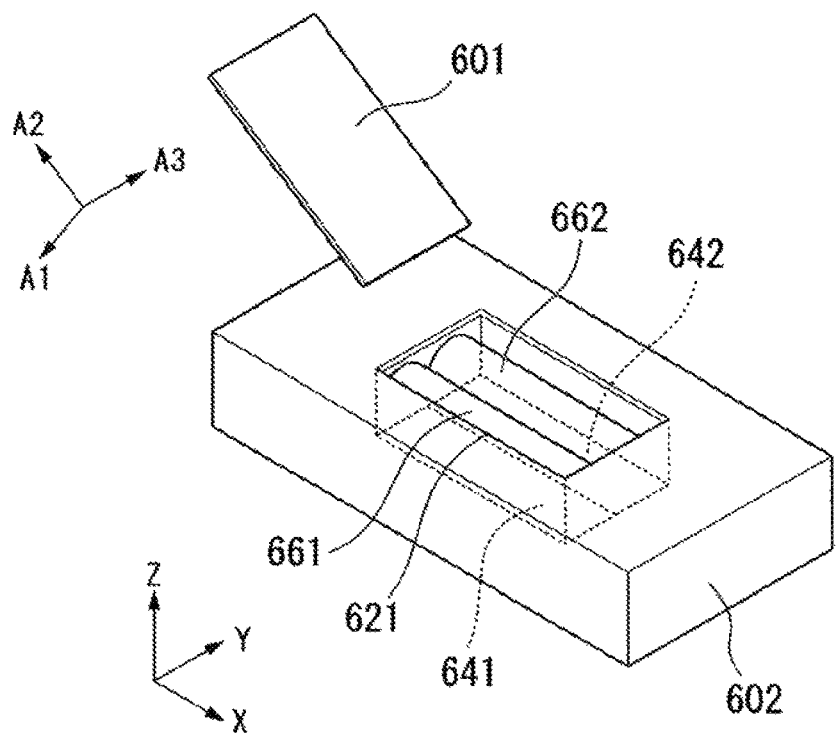
FIG. 11 is a diagram illustrating a schematic exterior of an insertion object and an inserted object according to an embodiment (third embodiment) of the invention.

FIG. 11 is a diagram illustrating a schematic exterior of an insertion object 601 and an inserted object 602 according to an embodiment (third embodiment) of the invention.

FIG. 11 illustrates the same X-Y-Z coordinate axes and A1-A2-A3 coordinate axes as those of the first embodiment.

Here, in FIG. 11, to easily view the drawing, the robot 11 holding an insertion object 601 is not illustrated (in particular, the end effector E1 is not illustrated).

FIG. 11 illustrates the insertion object 601 which is a cover and an inserted object 602 including an inserted portion 681 to which the over is inserted. The inserted portion 681 has an opening (insertion port). In the example of FIG. 11, the insertion object 601 is a cover of the accommodation unit that accommodates batteries 661 and 662. The inserted object 602 is any of various devices into which a battery is inserted and may be, for example, a remote controller.

The inserted object 602 includes a hole 621 into in which two insertion objects 661 and 662 can be inserted in parallel. The hole 621 includes a battery inserted portion 641 into which one insertion object 661 is inserted and a battery inserted portion 642 in which the other insertion object 662 is inserted.

The hole 621 is formed as the accommodation unit and includes an inserted portion 681.

In the example of FIG. 11, two batteries 661 and 662 are inserted into two battery inserted portions 641 and 642.

In the embodiment, the control device 12 controls the robot 11 such that the insertion object 601 held by the end effector E1 of the robot 11 is inserted into the inserted portion 681 for assembly.

For example, when a state in which the insertion object 601 according to the embodiment is inserted into the inserted portion 681 and a state in which the insertion object 71 according to the first embodiment is inserted into the inserted object 72 are considered, the control device 12 inserts the insertion object 601 into the inserted portion 681 for assembly, as in the first embodiment, by setting disposition of the inserted object 602, a position and an orientation at which the insertion object 601 is held by the end effector E1 of the robot 11, and a job performed on the insertion object 601 held by the end effector E1 of the robot 11 (for example, the process of the processing flow illustrated in FIG. 8) so that the X-Y-Z coordinate system matches the A1-A2-A3 coordinate system.

When the insertion object 601 can be inserted into the inserted portion 681, the control device 12 may perform control of an inserting job in accordance with any other scheme.

Conclusion of Third Embodiment

As described above, in the control device 12, the robot 11, and the robot system 1 according to the embodiment, the control device 12 can control the robot 11 such that a job (a job of closing the cover) of inserting the insertion object 601 which is a cover into the inserted object 602 which is the accommodation unit of the cover can be efficiently performed without performing a probing operation.

In the embodiment, it is possible to obtain the same advantages as those of the first embodiment.

In the embodiment, the aspect in which the insertion object 601 is held by the robot 11 has been described. As another example, an aspect in which the inserted object 602 is held by the robot 11 or an aspect in which both the insertion object 601 and the inserted object 602 are held by the robot 11 or the like may be used.

Fourth Embodiment

In the embodiment, differences from the first embodiment will be described mainly. The description of the same points as those of the first embodiment will be simplified or omitted.

In the embodiment, to facilitate the description, the same reference numerals are given to the same configurations or processes as the configurations or the processes illustrated in FIGS. 1 to 8 referred to in the description of the first embodiment.

Schematically, the embodiment is different from the first embodiment in an insertion object and an inserted object used for an inserting job by the robot 11.

The embodiment is different from the first embodiment in that the inserted object is held by the robot 11 and the job is performed.

Figure 12:
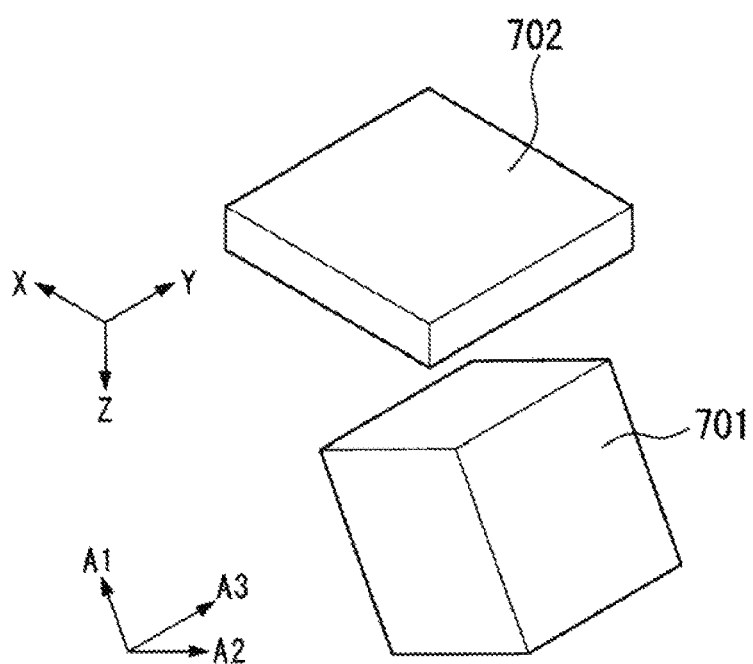
FIG. 12 is a diagram illustrating a schematic exterior of an insertion object and an inserted object according to an embodiment (fourth embodiment) of the invention.

FIG. 12 is a diagram illustrating a schematic exterior of an insertion object 701 and an inserted object 702 according to an embodiment (fourth embodiment) of the invention.

FIG. 12 illustrates the same X-Y-Z coordinate axes and A1-A2-A3 coordinate axes as those of the first embodiment.

Here, in FIG. 12, to easily view the drawing, the robot 11 holding an inserted object 702 is not illustrated (in particular, the end effector E1 is not illustrated).

FIG. 12 illustrates the inserted object 702 which is a cover and the insertion object 701 which is inserted into the cover. In the example of FIG. 12, the insertion object 701 is a body of a can and the inserted object 702 is a cover that covers a part of the body of the can and has an opening (insertion port).

In the embodiment, the control device 12 controls the robot 11 such that the insertion object 701 is inserted into the inserted object 702 for assembly by moving the inserted object 702 held by the end effector E1 of the robot 11.

For example, when a state in which the insertion object 701 according to the embodiment is inserted into the inserted object 702 and a state in which the insertion object 71 according to the first embodiment is inserted into the inserted object 72 are considered, the control device 12 inserts the insertion object 701 into the inserted object 702 for assembly, as in the first embodiment, by setting disposition of the insertion object 701, a position and an orientation at which the inserted object 702 is held by the end effector E1 of the robot 11, and a job performed on the inserted object 702 held by the end effector E1 of the robot 11 (for example, the process of the processing flow illustrated in FIG. 8) so that the X-Y-Z coordinate system matches the A1-A2-A3 coordinate system.

Here, while the inserted object 702 is held and moved by the robot 11 in the embodiment and the insertion object 71 is held and moved by the robot 11 in the first embodiment. For example, the same applies to, for example, relative movements of the insertion object and the inserted object. That is, in the embodiment, the inserted object 702 is held by the robot 11 to perform an operation so that the same inserting job as the inserting job performed by holding the insertion object 701 by the robot 11.

When the insertion object 701 can be inserted into the inserted object 702, the control device 12 may perform control of an inserting job in accordance with any other scheme.

Conclusion of Fourth Embodiment

As described above, in the control device 12, the robot 11, and the robot system 1 according to the embodiment, the control device 12 can control the robot 11 such that a job of inserting the insertion object 701 which is a can into the inserted object 702 which is the cover of the can can be efficiently performed without performing a probing operation.

In the embodiment, it is possible to obtain the same advantages as those of the first embodiment.

Here, in the embodiment, the can that has a cubic shape has been described. However, the can may have any shape. For example, a can that is roundish may be used.

In the embodiment, the aspect in which the inserted object 702 is held by the robot 11 has been described. As another example, an aspect in which the insertion object 701 is held by the robot 11 or an aspect in which both the insertion object 701 and the inserted object 702 are held by the robot 11 or the like may be used.

Configuration Example

As one configuration example, a control device controls a robot including a movable unit in which a force measurement unit and a holding unit are installed. The control device includes a control unit that is capable of controlling the movable unit such that a first contacting operation of setting an inserted object having an insertion port and held by the holding unit to a first orientation and bringing the inserted object (in the example of FIG. 12, the inserted object 702) into contact with an insertion object (in the example of FIG. 12, the insertion object 701) is performed, and subsequently an inserting operation of setting the inserted object to a second orientation different from the first orientation and inserting the insertion object into the insertion port by relatively moving the inserted object and the insertion object in a first direction is performed. Between the first contacting operation and the inserting operation, the control unit performs the second contacting operation of bringing the insertion object and the inserted object into contact with a portion different from a contact portion in the first contacting operation by performing force control such that a component of a target force in a second direction orthogonal to the first direction is set to a value greater than 0 based on an output from the force measurement unit at an orientation at which the inserted object is tilted with respect to the second orientation. In this example, the object held by the holding unit is not the insertion object but is the inserted object compared to the first embodiment. Except for this point, the same operation (a relative operation between the insertion object and the inserted object) as that of the first embodiment is performed.

In the control device, as one configuration example, when the inserted object is set from the first orientation to the second orientation, the control unit performs the force control such that the component of the target force in the second direction is set to the value greater than 0 based on the output from the force measurement unit. As the target force of the force control at this time, another aspect may be used.

Fifth Embodiment

In the embodiment, differences from the first embodiment will be described mainly. The description of the same points as those of the first embodiment will be simplified or omitted.

In the embodiment, to facilitate the description, the same reference numerals are given to the same configurations or processes as the configurations or the processes illustrated in FIGS. 1 to 8 referred to in the description of the first embodiment.

Schematically, the embodiment is different from the first embodiment in an insertion object and an inserted object used for an inserting job by the robot 11.

Figure 13:
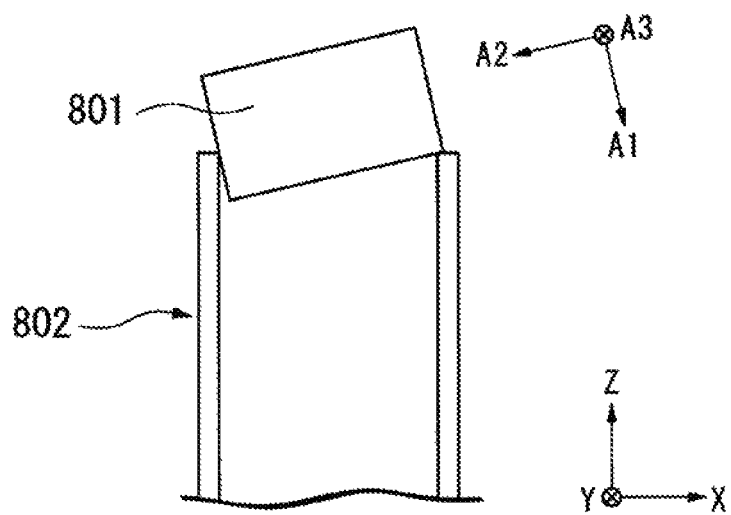
FIG. 13 is a diagram illustrating a schematic exterior of an insertion object and an inserted object according to an embodiment (fifth embodiment) of the invention.

FIG. 13 is a diagram illustrating a schematic exterior of an insertion object 801 and an inserted object 802 according to an embodiment (fifth embodiment) of the invention.

FIG. 13 illustrates the same X-Y-Z coordinate axes and A1-A2-A3 coordinate axes as those of the first embodiment.

Here, in FIG. 13, to easily view the drawing, the robot 11 holding an insertion object 801 is not illustrated (in particular, the end effector E1 is not illustrated).

FIG. 13 illustrates an insertion object 801 and an inserted object 802 which is hollow and into which the insertion object 801 is inserted. In the example of FIG. 13, the insertion object 801 may be any object or a stopper of the hose made of rubber. The inserted object 802 is a hose made of rubber, is hollow, and has an opening (insertion port).

In the embodiment, the control device 12 controls the robot 11 such that the insertion object 801 held by the end effector E1 of the robot 11 is inserted into the hollow portion of the inserted object 802 for assembly.

For example, when a state in which the insertion object 801 according to the embodiment is inserted into the inserted object 802 and a state in which the insertion object 71 according to the first embodiment is inserted into the inserted object 72 are considered, the control device 12 inserts the insertion object 801 into the inserted object 802 for assembly, as in the first embodiment, by setting disposition of the inserted object 802, a position and an orientation at which the insertion object 801 is held by the end effector E1 of the robot 11, and a job performed on the insertion object 801 held by the end effector E1 of the robot 11 (for example, the process of the processing flow illustrated in FIG. 8) so that the X-Y-Z coordinate system matches the A1-A2-A3 coordinate system.

When the insertion object 801 can be inserted into the inserted object 802, the control device 12 may perform control of an inserting job in accordance with any other scheme.

Here, in the embodiment, the inserted object 802 is a hose made of rubber and is an elastic body. Therefore, when the insertion object 801 held by the robot 11 is inserted into the inserted object 802, the inserted object 802 can be deformed (elastically deformed). As the deformation, there is extending deformation or shrinking deformation.

In the embodiment, the case in which the inserted object 802 is an elastic body has been described. As another configuration example, the insertion object 801 may be an elastic body or both the insertion object 801 and the inserted object 802 may be elastic bodies. In the embodiment, when the insertion object 801 may not be inserted into the inserted object 802 in a state in which the insertion object may not be elastically deformed, the insertion object 801 can be inserted into the inserted object 802 by elastically deforming at least one of the insertion object 801 and the inserted object 802.

As the elastic body, a material other than rubber may be used.

Conclusion of Fifth Embodiment

As described above, in the control device 12, the robot 11, and the robot system 1 according to the embodiment, the control device 12 can control the robot 11 such that a job of inserting the insertion object 801 into the inserted object 802 can be efficiently performed without performing a probing operation even when both one or both of the insertion object 801 and the inserted object 802 are an elastic body.

In the embodiment, it is possible to obtain the same advantages as those of the first embodiment.

In the embodiment, for example, even when an area of the insertion object 801 is larger than an area of the inserted object 802 on a plane perpendicular in the insertion direction in a state in which the insertion object 801 is inserted into the inserted object 802, the control device 12 can control the robot 11 such that the insertion object 801 is inserted into the inserted object 802 by extending the inserted object 802 by contact with the insertion object 801. In the example of FIG. 13, even when an area of the hollow opening of the inserted object 802 which is the hose is slightly larger the area of the insertion object 801 (the area of a surface corresponding to the opening), the control device 12 can insert the insertion object 801 into the inserted object 802 by extending (enlarging) the hose by the elasticity of the hose.

In this way, in the embodiment, the inserting job can be performed when clearance of the inserted object 802 with respect to the insertion object 801 is negative.

For example, when the insertion object 801 has elasticity, the control device 12 can control the robot 11 such that a part of the insertion object 801 or the whole insertion object 801 is elastically deformed to be contracted. The control device 12 can insert the insertion object 801 into the inserted object 802 in a state in which the insertion object 801 (for example, a spot in which the insertion object 801 is first inserted into the opening of the inserted object 802) is shrunk.

In the embodiment, the aspect in which the insertion object 801 is held by the robot 11 has been described. As another example, an aspect in which the inserted object 802 is held by the robot 11 or an aspect in which both the insertion object 801 and the inserted object 802 are held by the robot 11 or the like may be used.

Configuration Example

In the control device, as one configuration example, in the inserting operation, the control unit elastically deforms at least one (in the embodiment, the inserted object 802) of the insertion object (in the example of FIG. 13, the insertion object 801) and the inserted object (in the example of FIG. 13, the inserted object 802). As the insertion object and the inserted object, an object which is elastically deformed may not necessarily be used.

Sixth Embodiment

In the embodiment, differences from the first embodiment will be described mainly. The description of the same points as those of the first embodiment will be simplified or omitted.

In the embodiment, to facilitate the description, the same reference numerals are given to the same configurations or processes as the configurations or the processes illustrated in FIGS. 1 to 8 referred to in the description of the first embodiment.

Schematically, the embodiment is different from the first embodiment in an insertion object and an inserted object used for an inserting job by the robot 11.

Figure 14:
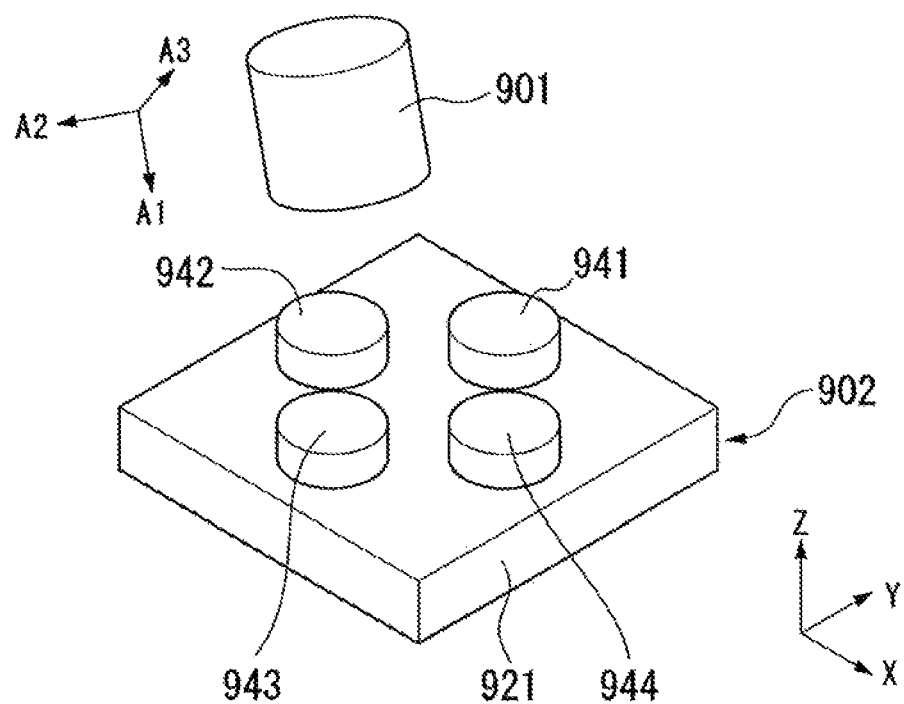
FIG. 14 is a diagram illustrating a schematic exterior of an insertion object and an inserted object according to an embodiment (sixth embodiment) of the invention.

FIG. 14 is a diagram illustrating a schematic exterior of an insertion object 901 and an inserted object 902 according to an embodiment (sixth embodiment) of the invention.

FIG. 14 illustrates the same X-Y-Z coordinate axes and A1-A2-A3 coordinate axes as those of the first embodiment.

Here, in FIG. 14, to easily view the drawing, the robot 11 holding an insertion object 901 is not illustrated (in particular, the end effector E1 is not illustrated).

FIG. 14 illustrates an insertion object 901 which is a gear and an inserted object 902 which is a gear device into which the gear is inserted.

The inserted object 902 includes a support 921 with a planar shape and four gears 941 to 944 installed on one surface of the support 921. In the embodiment, a portion surround by the four gears 941 to 944 is an opening (insertion port).

Here, in the embodiment (the example of FIG. 14), each gear (the insertion object 901 which is a gear and the gears 941 to 944) is formed in a schematic shape (a cylindrical shape). For example, actually, gears of a gearwheel are used.

In the embodiment, the control device 12 controls the robot 11 such that a job assembling the insertion object 901 with the four gears 941 to 944 installed on the support 921 is performed by moving the insertion object 901 held by the robot 11. In this case, the control device 12 controls the robot 11 such that phases of the insertion object 901 held by the robot 11 and the four gears 941 to 944 are matched (here, the phase of the gearwheel).

In the embodiment, each gear (the insertion object 901 which is a gear and the gears 941 to 944) has a circular shape (actually, there are gears of the gearwheel) when viewed in the direction of the Z axis. The four gears 941 to 944 have the same shape. The circular shape of the insertion object 901 is greater than the circular shape of the four gears 941 to 944 (the diameter of the circle is larger).

The four gears 941 to 944 are disposed at positions at which all the four gears 941 to 944 engage (are fitted) with the insertion object 901. Specifically, a predetermined position (central position) on the upper surface of the support 921 is set as a center, the four gears 941 to 944 are disposed at the same distance from the central position and at the same angle interval in the direction of rotation (rotating) on the surface centering on the central position. That is, the four gears 941 to 944 are disposed to be rotationally symmetric on a circle on the surface centering on the central position.

When the insertion object 901 and the four gears 941 to 944 are fitted so that the phases are matched (the gears of the gearwheel are meshed), the position of the center of the circular shape of the insertion object 901 matches a central position of a portion surrounded by the four gears 941 to 944.

For example, when a state in which the insertion object 901 according to the embodiment is inserted into the inserted object 902 (between the four gears 941 to 944) and a state in which the insertion object 71 according to the first embodiment is inserted into the inserted object 72 are considered, the control device 12 inserts the insertion object 901 into the inserted object 902 for assembly, as in the first embodiment, by setting disposition of the inserted object 902, a position and an orientation at which the insertion object 901 is held by the end effector E1 of the robot 11, and a job performed on the insertion object 901 held by the end effector E1 of the robot 11 (for example, the process of the processing flow illustrated in FIG. 8) so that the X-Y-Z coordinate system matches the A1-A2-A3 coordinate system.

When the insertion object 901 can be inserted into the inserted object 902, the control device 12 may perform control of an inserting job in accordance with any other scheme.

Conclusion of Sixth Embodiment

As described above, in the control device 12, the robot 11, and the robot system 1 according to the embodiment, the control device 12 can control the robot 11 such that a job of inserting the insertion object 901 which is a gear into the inserted object 902 including the four gears 941 to 944 can be efficiently performed without performing a probing operation.

In the embodiment, it is possible to obtain the same advantages as those of the first embodiment.

In the embodiment, the gear device including the four gears 941 to 944 has been the inserted object 902. For example, the gear device including any number of gears may be used as the inserted object 902.

Thus, in the control device 12, the robot 11 and the robot system 1 according to the embodiment, it possible to efficiently perform a job of assembling two objects with one object by matching the phases of the two objects with the one object.

In the embodiment, the case in which the one object (the insertion object 901 in the embodiment) and four objects (the gears 941 to 944 in the embodiment) are assembled has been described. As another example, a configuration in which one object is assembled with two objects may be used, a configuration in which one object is assembled with three objects may be used, or a configuration in which one object is assembled with five objects may be used.

In the embodiment, the aspect in which the insertion object 901 is held by the robot 11 has been described. As another example, an aspect in which the inserted object 902 is held by the robot 11 or an aspect in which both the insertion object 901 and the inserted object 902 are held by the robot 11 or the like may be used.

Conclusion of Foregoing Embodiments

As the insertion object or the inserted object, any of various objects may be used.

For example, any configuration may be used with regard to the size or shape of the insertion object or the inserted object.

In the foregoing embodiments, the vertical articulated robot has been used as the robot, but any robot may be used as another configuration example. For example, as the robot, a robot that has two arms (dual-arm robot) may be used or a robot that has three or more arms may be used. For example, a scalar robot may also be used as the robot. In each robot, for example, a portion (for example, a portion corresponding to an arm) moving the holding unit may be used as the movable unit.

A program realizing a function of any constituent in the above-described device (for example, the control device 12) may be recorded (stored) on a computer-readable recording medium (storage medium) and the program may be read to a computer system to be executed. The "computer system" mentioned herein is assumed to include an operating system (OS) or hardware such as peripheral devices. The "computer-readable recording medium" refers to a flexible disc, a magneto-optical disc, a read-only memory (ROM), a portable medium such as a compact disc (CD)-ROM, or a storage device such as a hard disk contained in the computer system. Further, the "computer-readable recording medium" includes a medium that retains a program for a given time, such as a volatile memory (a random access memory (RAM)) inside a computer system serving as a server or a client when the program is transmitted via a network such as the Internet or a communication channel such as a telephone channel.

As the recording medium, for example, a recording medium detachably mounted on a computer may be used. As the recording medium, for example, a recording medium that temporarily records data may be used.

The foregoing program may be transmitted from a computer system that stores the program in a storage device or the like to another computer system via a transmission medium or by transmission waves through a transmission medium. Here, the "transmission medium" transmitting the program refers to a medium that has a function of transmitting information, such as a network (communication network) such as the Internet or a communication channel (communication line) such as a telephone channel.

The foregoing program may be a program realizing some of the above-described functions. Further, the foregoing program may be a so-called differential file (differential program) that can be realized in combination with a program in the above-described functions have already been recorded in a computer system.

Figure 15:
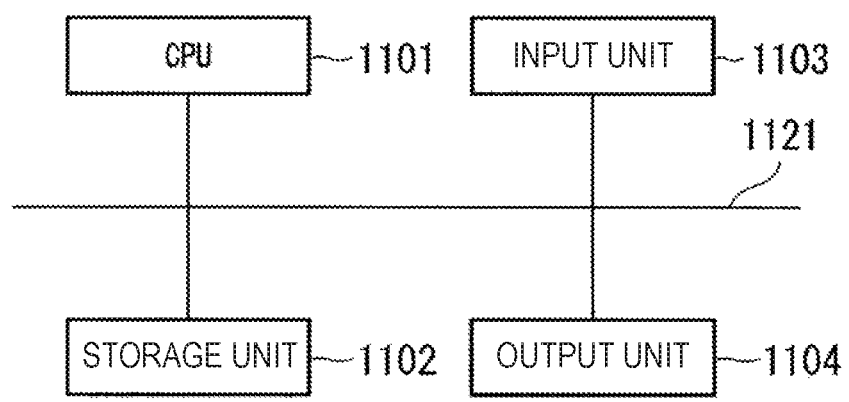
FIG. 15 is a diagram illustrating an example of a hardware configuration of a control device according to an embodiment of the invention.

FIG. 15 is a diagram illustrating an example of a hardware configuration of the control device 12 according to an embodiment of the invention.

In the example of FIG. 15, the control device 12 includes a CPU 1101, a storage unit 1102, an input unit 1103, an output unit 1104, and a bus 1121 connecting these units to be communicable. Here, when the example of FIG. 15 is compared with the example of FIG. 2, the CPU 1101, the storage unit 1102, the input unit 1103, and the output unit 1104 illustrated in FIG. 15 correspond to the control unit 114, the storage unit 113, the input unit 111, and the output unit 112 illustrated in FIG. 12, respectively.

In the example of FIG. 15, the CPU 1101 executes the program stored in the storage unit 1102 so that the function of the information acquisition unit 131, the function of the determination unit 132, and the function of the robot control unit 133 illustrated in FIG. 2 are realized. When the CPU 1101 executes the control program, the CPU 1101 performs operations in accordance with content (commands) defined in the control program.

The storage unit 1102 may be an externally attached storage device that is connected to a digital input and output port such as a USB instead being contained in the control device 12.

The input unit 1103 may be, for example, a keyboard, a mouse, a touch pad, or any other input device. The input unit 1103 may be, for example, a touch panel integrated with a display unit (not illustrated). The input unit 1103 may be separate from the control device 12.

The output unit 1104 may be, for example, a display unit.

The embodiments of the invention have been described above in detail with reference to the drawings, but specific configurations are not limited to the embodiments. Designs or the like within the scope of the invention without departing from the gist of the invention are also included.

The entire disclosure of Japanese Patent Application No. 2017-103795, filed May 25, 2017 is expressly incorporated by reference herein.

What is claimed is:

1. A control device controlling a robot including an arm in which a force sensor and an end effector are installed, the control device comprising:
    a processor that is configured to execute computer-executable instructions so as to control a robot,
    wherein the processor is configured to control the arm such that a first contacting operation of setting an insertion object held by the end effector to a first orientation and bringing the insertion object into contact with an inserted object having an insertion port is performed, and subsequently an inserting operation of setting the insertion object to a second orientation different from the first orientation into the insertion port and inserting the insertion object into the insertion port by relatively moving the insertion object and the inserted object in a first direction is performed,
    wherein between the first contacting operation and the inserting operation, the processor is configured to perform a second contacting operation of bringing the insertion object and the inserted object into contact with each other in a portion different from a contact portion in the first contacting operation by performing force control such that a component of a target force in a second direction orthogonal to the first direction is set to a value greater than 0 based on an output from the force sensor at an orientation at which the insertion object is tilted with respect to the second orientation.

2. The control device according to claim 1,
    wherein when the insertion object is set from the first orientation to the second orientation, the processor is configured to perform the force control such that the component of the target force in the second direction is set to the value greater than 0 based on the output from the force sensor.

3. A control device controlling a robot including an arm in which a force sensor and an end effector are installed, the control device comprising:

a processor that is configured to execute computer-executable instructions so as to control a robot, wherein the processor is configured to control the arm such that a first contacting operation of setting an inserted object having an insertion port and held by the end effector to a first orientation and bringing the inserted object into contact with an insertion object is performed, and subsequently an inserting operation of setting the inserted object to a second orientation different from the first orientation and inserting the insertion object into the insertion port by relatively moving the inserted object and the insertion object in a first direction is performed, wherein between the first contacting operation and the inserting operation, the processor is configured to perform a second contacting operation of bringing the insertion object and the inserted object into contact with each other in a portion different from a contact portion in the first contacting operation by performing force control such that a component of a target force in a second direction orthogonal to the first direction is set to a value greater than 0 based on an output from the force sensor at an orientation at which the inserted object is tilted with respect to the second orientation.

4. The control device according to claim 3, wherein when the inserted object is set from the first orientation to the second orientation, the processor is configured to perform the force control such that the component of the target force in the second direction is set to the value greater than 0 based on the output from the force sensor.

5. The control device according to claim 1, wherein in the second contacting operation, the processor is configured to perform the force control such that a component of the target force in a third direction orthogonal to the first and second directions is set to a value greater than 0 based on an output from the force sensor.

6. The control device according to claim 1, wherein in the inserting operation, the processor is configured to perform the force control such that a component of the target force in the first direction is set to a value greater than 0 based on an output from the force sensor.

7. The control device according to claim 6, wherein in the inserting operation, the processor is configured to perform the force control such that the component of the target force in the second direction is less than the component of the target force in the first direction based on an output from the force sensor.

8. The control device according to claim 1, wherein the end effector is rotatable around a first rotation axis, and wherein in the first contacting operation, the second contacting operation, and the inserting operation, the processor is configured to perform the force control such that a component of the target force around the first rotation axis is set to a value less than a component of the target force in the first direction based on an output from the force sensor.

9. The control device according to claim 8, wherein in the first contacting operation, the second contacting operation, and the inserting operation, the processor is configured to perform the force control such that the component of the target force around the first rotation axis is set to 0 based on an output from the force sensor.

10. The control device according to claim 1, wherein an angle of the tilting is less than 45 degrees.

11. The control device according to claim 1, wherein processor is configured to elastically deform at least one of the insertion object and the inserted object in the inserting operation.

12. The control device according to claim 1, wherein the force sensor measures a force with a piezoelectric element.

13. The control device according to claim 12, wherein the piezoelectric element is a quartz crystal.

14. A robot system comprising:

a robot that comprises an arm in which a force sensor and an end effector are installed; and a control device that comprises a processor that is configured to execute computer-executable instructions so as to control the robot;

wherein the processor is configured to control the arm such that a first contacting operation of setting an insertion object held by the end effector to a first orientation and bringing the insertion object into contact with an inserted object having an insertion port is performed, and subsequently an inserting operation of setting the insertion object to a second orientation different from the first orientation into the insertion port and inserting the insertion object into the insertion port by relatively moving the insertion object and the inserted object in a first direction is performed, wherein between the first contacting operation and the inserting operation, the processor is configured to perform a second contacting operation of bringing the insertion object and the inserted object into contact with each other in a portion different from a contact portion in the first contacting operation by performing force control such that a component of a target force in a second direction orthogonal to the first direction is set to a value greater than 0 based on an output from the force sensor at an orientation at which the insertion object is tilted with respect to the second orientation.

15. The robot system according to claim 14, wherein when the insertion object is set from the first orientation to the second orientation, the processor is configured to perform the force control such that the component of the target force in the second direction is set to the value greater than 0 based on the output from the force sensor.

16. The robot system according to claim 14, wherein in the second contacting operation, the processor is configured to perform the force control such that a component of the target force in a third direction orthogonal to the first and second directions is set to a value greater than 0 based on an output from the force sensor.

17. The robot system according to claim 14, wherein in the inserting operation, the processor is configured to perform the force control such that a component of the target force in the first direction is set to a value greater than 0 based on an output from the force sensor.

18. The robot system according to claim 17, wherein in the inserting operation, the processor is configured to perform the force control such that the component of the target force in the second direction is less than the component of the target force in the first direction based on an output from the force sensor.

19. The robot system according to claim 14,
wherein the end effector is rotatable around a first rotation axis, and
wherein in the first contacting operation, the second contacting operation, and the inserting operation, the processor is configured to perform the force control such that a component of the target force around the first rotation axis is set to a value less than a component of the target force in the first direction based on an output from the force sensor.

20. The robot system according to claim 19,
wherein in the first contacting operation, the second contacting operation, and the inserting operation, the processor is configured to perform the force control such that the component of the target force around the first rotation axis is set to 0 based on an output from the force sensor.

\* \* \* \* \*